United States Patent
Wang et al.

(10) Patent No.: US 11,487,384 B1
(45) Date of Patent: Nov. 1, 2022

(54) TOUCH DEVICE AND COMMUNICATION METHOD THEREOF

(71) Applicant: Novatek Microelectronics Corp., Hsinchu (TW)

(72) Inventors: Tsung-Yu Wang, Hsinchu County (TW); Yun-Hsiang Yeh, Hsinchu (TW); Yen-Heng Chen, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 17/477,513

(22) Filed: Sep. 16, 2021

Related U.S. Application Data

(60) Provisional application No. 63/213,671, filed on Jun. 22, 2021.

(51) Int. Cl.
    *G06F 3/041* (2006.01)
(52) U.S. Cl.
    CPC ................................ *G06F 3/04166* (2019.05)
(58) Field of Classification Search
    None
    See application file for complete search history.

(56) References Cited

U.S. PATENT DOCUMENTS

| | | | |
|---|---|---|---|
| 10,725,572 B2 | 7/2020 | Kim et al. | |
| 2014/0139491 A1 | 5/2014 | Han et al. | |
| 2016/0170548 A1 | 6/2016 | Suzuki | |
| 2016/0266704 A1* | 9/2016 | Park | G06F 3/1446 |
| 2018/0113548 A1* | 4/2018 | Lee | G06F 3/04164 |
| 2019/0056836 A1 | 2/2019 | Lee et al. | |
| 2019/0171320 A1 | 6/2019 | Kim et al. | |
| 2019/0279600 A1* | 9/2019 | Chan | G06F 3/04166 |

FOREIGN PATENT DOCUMENTS

| | | |
|---|---|---|
| TW | 201624227 | 7/2016 |
| TW | 201926011 | 7/2019 |

OTHER PUBLICATIONS

"Office Action of Taiwan Counterpart Application", dated Jun. 20, 2022, p. 1-p. 5.

* cited by examiner

*Primary Examiner* — Krishna P Neupane
(74) *Attorney, Agent, or Firm* — JCIPRNET

(57) ABSTRACT

The invention provides a touch device and a communication method thereof. The touch device includes a display panel and a controller. The controller controls the display panel to perform a display driving operation and a touch sensing operation. The controller may transmit a first wireless signal to another slave communication device via the display panel in a touch sensing period. The controller may receive a second wireless signal sent by another master communication device via the display panel in the touch sensing period. When the touch device serves as one of a master communication device and a slave communication device, a time length of the touch sensing period is a first time length. When the touch device serves as the other of the master communication device and the slave communication device, the time length of the touch sensing period is a second time length greater than the first time length.

32 Claims, 17 Drawing Sheets

FIG. 10

| F101-1 | F101-2 | F101-3 | F101-4 | F101-5 | F101-6 | F101-7 | F101-8 | F101-9 | F101-10 |
|---|---|---|---|---|---|---|---|---|---|
| F3 | F1 | F2 | F1 | F2 | F3 | F1 | F2 | F1 | F2 |

11

| F102-1 | F102-2 | F102-3 | F102-4 | F102-5 | F102-6 | F102-7 | F102-8 | F102-9 | F102-10 |
|---|---|---|---|---|---|---|---|---|---|

21

## TOUCH DEVICE AND COMMUNICATION METHOD THEREOF

CROSS-REFERENCE TO RELATED APPLICATION

This application claims the priority benefit of U.S. application Ser. No. 63/213,671, filed on Jun. 22, 2021. The entirety of the above-mentioned patent application is hereby incorporated by reference herein and made a part of this specification.

BACKGROUND OF THE INVENTION

Field of the Invention

The invention relates to an electronic device, and particularly relates to a touch device and a communication method thereof.

Description of Related Art

Wireless communication may be performed between different electronic devices. Generally speaking, these electronic devices need to be equipped with wireless communication elements/circuits such as radio frequency circuits and antennas. For some simple communication applications, wireless communication elements such as radio frequency circuits and antennas are expensive and bulky elements.

SUMMARY OF THE INVENTION

The invention provides a touch device and a communication method thereof, so as to communicate using a display panel.

In an embodiment of the invention, a touch device includes a first display panel and a controller. The controller is coupled to the first display panel. The controller is configured to control the first display panel to perform a display driving operation in a display frame period, and control the first display panel to perform a touch sensing operation in a first touch sensing period overlapped in the display frame period. When the touch device is operated in a communication mode and serves as a master communication device, the controller transmits a first wireless signal to a second display panel of another slave communication device via the first display panel in the first touch sensing period. When the touch device is operated in the communication mode and serves as a slave communication device, the controller receives a second wireless signal sent by a third display panel of another master communication device via the first display panel in the first touch sensing period. When the touch device is operated in the communication mode and serves as one of the master communication device and the slave communication device, a time length of the first touch sensing period is a first time length. When the touch device is operated in the communication mode and serves as the other of the master communication device and the slave communication device, the time length of the first touch sensing period is a second time length greater than the first time length.

In an embodiment of the invention, a communication method includes: controlling, by a controller of the touch device, a first display panel of the touch device to perform a display driving operation in a display frame period and perform a touch sensing operation in a first touch sensing period overlapped in the display frame period; transmitting a first wireless signal to a second display panel of another slave communication device via the first display panel in the first touch sensing period by the controller when the touch device is operated in a communication mode and serves as a master communication device; and receiving, by the controller, a second wireless signal sent by a third display panel of another master communication device via the first display panel in the first touch sensing period when the touch device is operated in the communication mode and serves as a slave communication device. In particular, a time length of the first touch sensing period is a first time length when the touch device is operated in the communication mode and serves as one of the master communication device and the slave communication device; and the time length of the first touch sensing period is a second time length greater than the first time length when the touch device is operated in the communication mode and serves as the other of the master communication device and the slave communication device.

In an embodiment of the invention, a touch device includes a first display panel and a controller. The controller is coupled to the first display panel. The controller is configured to control the first display panel to perform a display driving operation in a first display frame period, and control the first display panel to perform a touch sensing operation in a first touch sensing period overlapped in the first display frame period. When the touch device is operated in a synchronization period of a communication mode, the controller receives a synchronization phase signal sent by a second display panel of another touch device via the first display panel in the first touch sensing period. In particular, the synchronization phase signal is configured to indicate a first time length between a current time point of the synchronization phase signal in a second display frame period of the other touch device and an end time point of the second display frame period. A time length between the current time point of the first touch sensing period and an original end time point of the first display frame period is a second time length. The controller calculates a delay time length according to the first time length and the second time length. The controller delays the end time point of the first display frame period according to the delay time length, so that a display frame timing of the touch device is synchronized with a display frame timing of the other touch device.

In an embodiment of the invention, a communication method includes: controlling, by a controller of the touch device, a first display panel of the touch device to perform a display driving operation in a first display frame period; controlling, by the controller, the first display panel to perform a touch sensing operation in a first touch sensing period overlapped in the display frame period; receiving, by the controller, a synchronization phase signal sent by a second display panel of another touch device via the first display panel in the first touch sensing period when the touch device is operated in a synchronization period of a communication mode, wherein the synchronization phase signal is configured to indicate a first time length between a current time point of the synchronization phase signal in a second display frame period of the other touch device to an end time point of the second display frame period, and a time length between the current time point at which the first touch sensing period is located and an original end time point of the first display frame period is a second time length; calculating, by the controller, a delay time length according to the first time length and the second time length; and delaying, by the controller, an end time point of the first display frame period according to the delay time length, so that a display frame timing of the touch device is synchronized with a display frame timing of the other touch device.

Based on the above, the touch transmission electrode of the display panel of the touch device of the embodiments of the invention may emit a frequency signal in the touch sensing period to perform the touch sensing operation. The frequency signal sent by the touch transmission electrode may be used as the wireless signal for communication. The touch receiving electrode of the display panel may sense a frequency signal to perform a touch sensing operation. Accordingly, the touch receiving electrode may be used as receiving antennas for communication. Therefore, touch devices may communicate using display panels.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 10 is a schematic diagram of the operation timing of two display panels of different touch devices shown according to still yet another embodiment of the invention.

DESCRIPTION OF THE EMBODIMENTS

Figure 1:
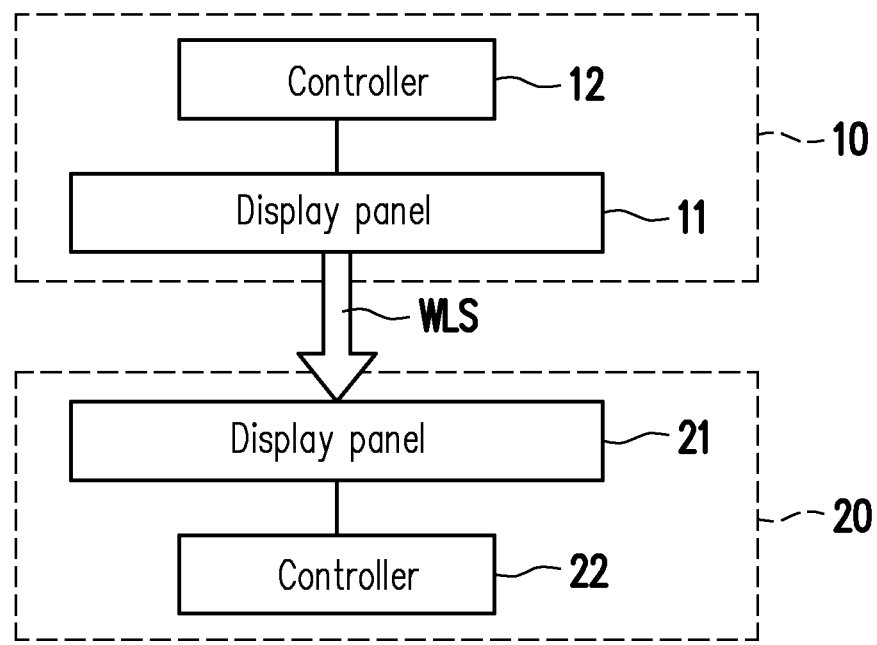
FIG. 1 is a schematic diagram of a situation in which two display panels of different touch devices communicate with each other according to an embodiment of the invention.

The term "coupled to (or connected to)" used in the entire text of the specification of the present application (including claims) may refer to any direct or indirect connecting means. For instance, if the text describes a first device is coupled to (or connected to) a second device, then it should be understood that the first device may be directly connected to the second device, or the first device may be indirectly connected to the second device via other devices or certain connecting means. Terms such as "first" and "second" mentioned in the entire specification of the present application (including the claims) are used to name the elements or to distinguish different embodiments or ranges, and are not used to restrict the upper or lower limits of the number of elements, nor are they used to limit the order of the elements. Moreover, when applicable, elements/components/steps having the same reference numerals in figures and embodiments represent the same or similar parts. Elements/components/steps having the same reference numerals or having the same terminology in different embodiments may be cross-referenced.

A touch sensing function may be embedded in a display panel. In the display panel, touch transmission electrode may send a touch drive signal to touch receiving electrode in a touch sensing period to perform a touch sensing operation. If the display panel of the touch device may be used for communication, then use convenience may be improved.

FIG. 1 is a schematic diagram of a situation in which two display panels of different touch devices communicate with each other according to an embodiment of the invention. The scenario shown in FIG. 1 includes a touch device 10 and a touch device 20, wherein the touch device 10 includes a display panel 11 having a touch function and a controller 12, and the touch device 20 includes a display panel 21 having a touch function and a controller 22. The controller 12 is coupled to the display panel 11. The controller 12 may control the display panel 11 to perform a display driving operation in a display frame period and to perform a touch sensing operation in a touch sensing period overlapped in the display frame period. The touch device 20, the display panel 21, and the controller 22 may be deduced with reference to the related description of the touch device 10, the display panel 11, and the controller 12, and are therefore not repeated herein. The touch device 10, the display panel 11, and the controller 12 are also as provided in the related description of the touch device 20, the display panel 21, and the controller 22.

In the application scenario shown in FIG. 1, the touch device 10 may be used as a master communication device, and the touch device 20 may be used as a slave communication device. When the touch device 10 and the touch device 20 are close to each other, the touch devices 10 and 20 may be operated in a communication mode. When the touch device 10 is operated in the communication mode and serves as a master communication device, the controller 12 of the touch device 10 may transmit a wireless signal WLS (touch drive signal) to the touch receiving electrode of the display panel 21 of the touch device 20 (slave communication device) via the touch transmissions electrode of the display panel 11 in the touch sensing period to perform a communication operation. When the touch device 20 is operated in the communication mode and serves as a slave communication device, the controller 22 of the touch device 20 may receive the wireless signal WLS sent by the display panel 11 of the touch device 10 (master communication device) via the touch receiving electrode of the display panel 21 in the touch sensing period. According to the actual operation situation, the touch device 20 may also act as a master communication device, and the touch device 10 may also act as a slave communication device.

Figure 2:
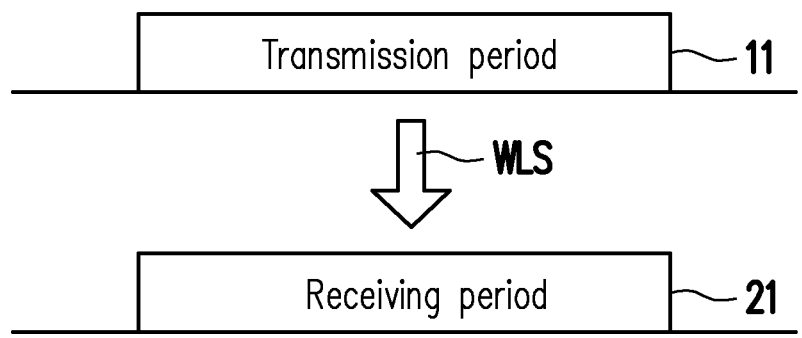
FIG. 2 is a schematic diagram of the timing of two display panels of different touch devices communicating with each other.

FIG. 2 is a schematic diagram of the timing of the two display panels 11 and 21 of the different touch devices 10 and 20 communicating with each other. The horizontal axis of FIG. 2 represents time. The upper part of FIG. 2 shows one driving period (transmission period) of the touch transmission electrode of the display panel 11 of the touch device 10. The lower part of FIG. 2 shows one driving period (receiving period) of the touch receiving electrode of the display panel 21 of the touch device 20. The touch device 10 may serve as a master device for a communication operation, and the touch device 20 may serve as a slave device for a communication operation. In the ideal state, the timing of the receiving period of the display panel 21 of the touch device 20 may match the transmission period of the display panel 11 of the touch device 10, so that the touch receiving electrode of the display panel 21 of the touch device 20 may sense the wireless signal WLS (frequency signal, such as a 100 KHz signal) sent by the touch transmission electrode of the display panel 11 of the touch device 10.

Figure 3:
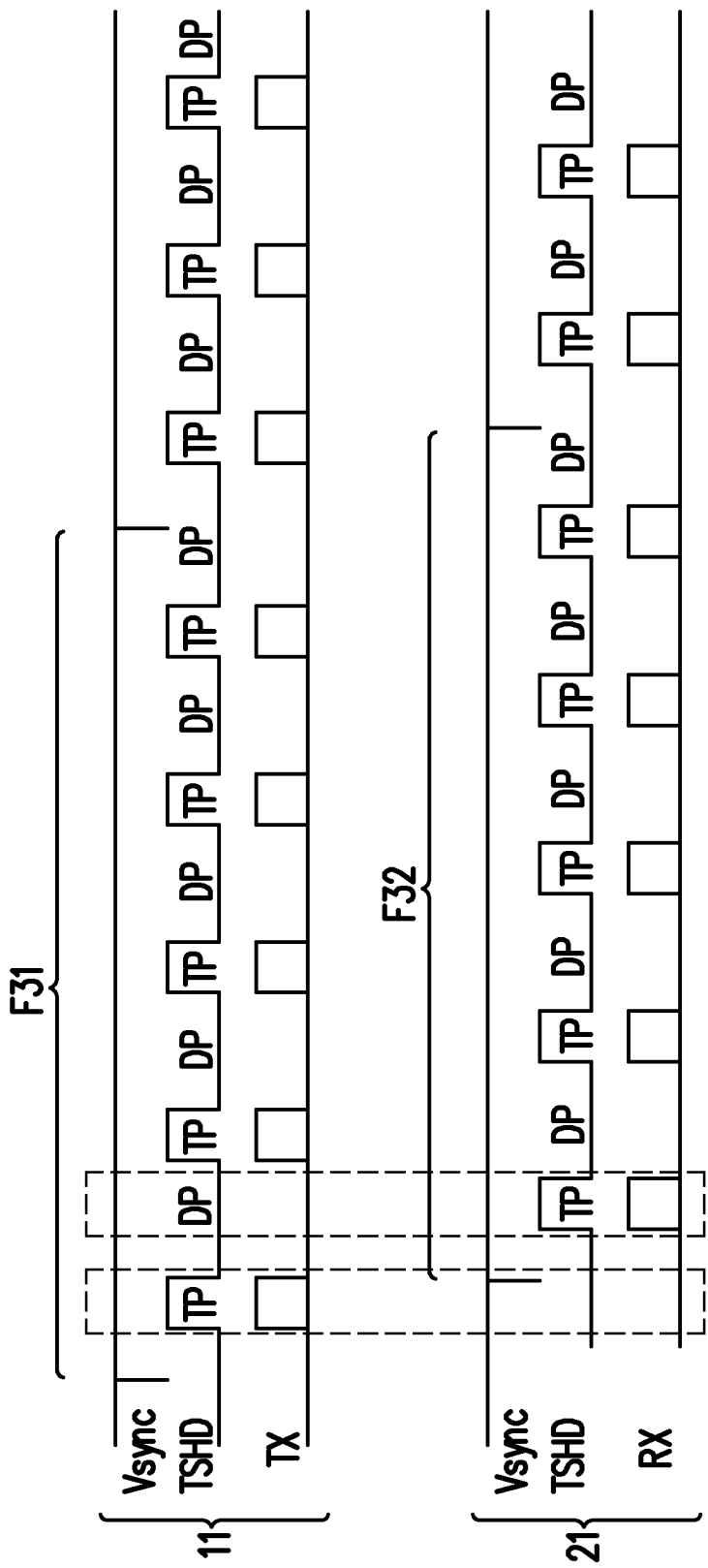
FIG. 3 shows a schematic diagram of the operation timing of two display panels of different touch devices.

Generally speaking, for a display panel embedded with a touch sensing function, the display driving operation and the touch sensing operation are performed in a time division multiplexing manner to avoid mutual interference. FIG. 3 shows a schematic diagram of the operation timing of the two display panels 11 and 21 of the different touch devices 10 and 20. The two touch devices 10 and 20 (may be mobile phones, tablet computers, or other devices using touch display panels) may be referred to as a master communication device and a slave communication device. The horizontal axis of FIG. 3 represents time. The upper part of FIG. 3 shows that the display panel of the master communication device (for example, the display panel 11 of the touch device 10) performs a display driving operation and a touch sensing operation in a time division multiplexing manner. A control signal TSHD of the display panel 11 may define the timings of display driving periods DP of the display driving operation and touch sensing periods TP of the touch sensing operation of the master communication device. A vertical synchronization signal Vsync of the display panel 11 may define a plurality of display frame periods of the display panel 11 of the master communication device (for example, a display frame period F31 shown in FIG. 3). The touch sensing operation in one display frame period F31 is divided into a plurality (for example, five), and these touch sensing operations are dispersed in different timings (the touch sensing periods TP) in one display frame period F31, as shown in the upper part of FIG. 3. According to the control signal TSHD of the display panel 11, a touch transmission electrode TX of the display panel 11 of the touch device 10 may send a touch drive signal to the touch receiving electrode of the display panel 11 of the touch device 10 at the touch sensing periods TP to perform a touch sensing operation. In addition, the touch transmission electrode TX of the display panel 11 of the touch device 10 may also send the wireless signal WLS (touch drive signal) to the touch device 20 in the touch sensing periods TP.

The lower part of FIG. 3 shows that the display panel of the slave communication device (for example, the display panel 21 of the touch device 20) performs a display driving operation and a touch sensing operation in a time division multiplexing manner. The control signal TSHD of the display panel 21 may define the timings of the display driving periods DP of the display driving operation and the touch sensing periods TP of the touch sensing operation of the touch device 20. The vertical synchronization signal Vsync of the display panel 21 may define a plurality of display frame periods of the display panel 21 of the touch device 20 (for example, the display frame period F31 shown in FIG. 3). The touch sensing operation in one display frame period F32 is divided into a plurality (for example, five), and these touch sensing operations are dispersed in different timings (the touch sensing periods TP) in one display frame period F32, as shown in the lower part of FIG. 3. According to the control signal TSHD of the display panel 21, the touch transmission electrode of the display panel 21 of the touch device 20 may send a touch drive signal to a touch receiving electrode RX of the display panel 21 of the touch device 20 at the touch sensing periods TP to perform a touch sensing operation. Moreover, the touch receiving electrode RX of the display panel 21 of the touch device 20 may also receive the touch drive signal (the wireless signal WLS) from the touch device 10 in the touch sensing periods TP.

However, according to the timing of the touch sensing periods TP shown in FIG. 3, the timing of the touch sensing periods TP (RX operation) of the display panel 21 of the touch device 20 may not match the timing of the touch sensing periods TP (TX operation) of the display panel 11 of the touch device 10. That is, the display panel 21 of the touch device 20 does not readily receive the wireless signal WLS of the display panel 11 of the touch device 10, so that the communication between the display panel 11 of the touch device 10 and the display panel 21 of the touch device 20 may fail.

A plurality of embodiments are described below. The display panel 11 of the touch device 10 (or the display panel 21 of the touch device 20) may dynamically change the time length of the touch sensing periods TP according to communication needs to improve the success rate of wireless communication. For example, when the display panel 11 (or the display panel 21) is operated in a non-communication mode, the time length of the touch sensing periods TP (the time length of the touch sensing periods) may be the first time length; and when the display panel 11 (or the display panel 21) is operated in the communication mode, the time length of the touch sensing periods TP (the time length of the touch sensing periods) is extended to the second time length (greater than the first time length). The first time length and the second time length may be determined according to actual design. In this way, the technique of "dynamically changing the time length of the touch sensing periods TP according to communication needs" may be applied to the master communication device or the slave communication device. The following plurality of embodiments illustrate that the technique is applied to the master communication device. According to the description of the following plurality of embodiments, the technique may be applied to a slave communication device.

Figure 4:
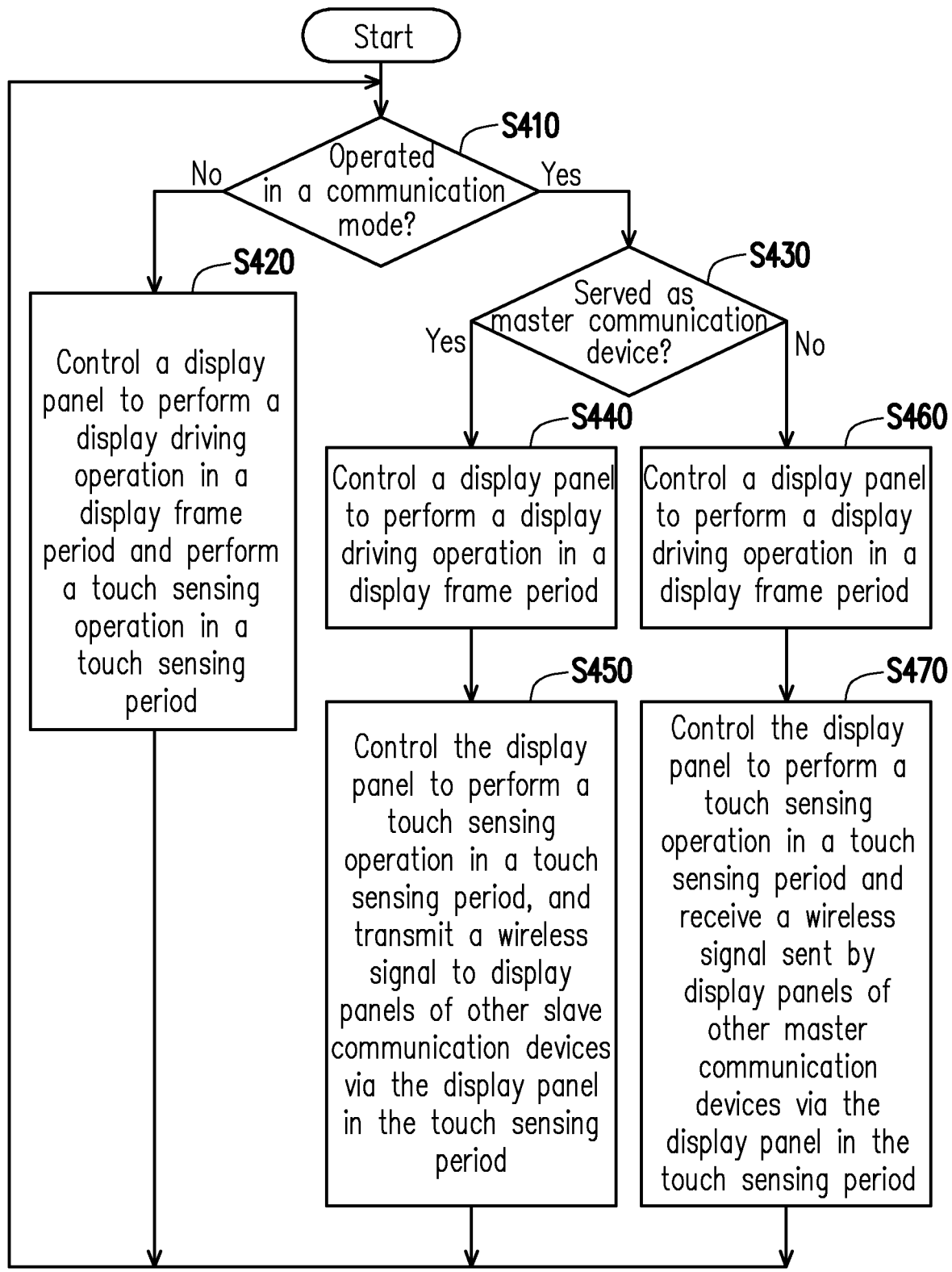
FIG. 4 is a schematic diagram of the flowchart of a communication method of a touch device shown according to an embodiment of the invention.

FIG. 4 is a schematic diagram of the flowchart of a communication method of the touch device 10 and/or the touch device 20 shown according to an embodiment of the invention. The touch device 10 and/or the touch device 20 shown in FIG. 1 is as described in the related description of FIG. 4. For the convenience of description, most of the content of the present embodiment takes the touch device 10 as an example of the communication method, and the communication method of the touch device 20 may be deduced with reference to the related description of the touch device 10. In step S410, the touch device 10 may determine whether it is operated in a communication mode. The present embodiment does not limit the determination mechanism of the communication mode. According to actual design, in some embodiments, the user may control the touch device 10 via a human-machine interface, so that the touch device 10 may be selectively operated in the communication mode, the non-communication mode, or other operation modes. In some other embodiments, the touch device 10 may detect whether there is a display panel of other devices (for example, the display panel 21 of the touch device 20) close to the display panel 11. Therefore, the touch device 10 may be selectively operated in the communication mode, the non-communication mode, or other operation modes according to the detection result.

When the touch device 10 is operated in the non-communication mode (the determination result of step S410 is "No"), the touch device 10 may perform step S420. In step S420, the controller 12 of the touch device 10 may control the display panel 11 to perform a display driving operation in the display driving periods DP of the display frame period F31, and perform a touch sensing operation in the touch sensing periods TP overlapped in the display frame period F31. When the touch device 10 is operated in the non-communication mode, the time length of each of the touch sensing periods TP is the first time length. The first time length may be determined according to actual design.

When the touch device 10 and the touch device 20 are close to each other, the touch devices 10 and 20 may be operated in the communication mode (the determination result of step S410 is "Yes"), and the touch devices 10 and 20 may perform step S430. In step S430, whether the touch devices 10 and 20 are used as master communication devices may be determined. The present embodiment does not limit the determination mechanism of the communication role. According to actual design, in some embodiments, the user may control the touch devices 10 and 20 via a human-machine interface, so that the touch devices 10 and 20 selectively serve as master communication devices, slave communication devices, or other communication roles. In some other embodiments, the touch devices 10 and 20 may negotiate with each other to determine whether the touch devices 10 and 20 serve as master communication devices, slave communication devices, or other communication roles.

When the touch device (for example, the touch device 10) serves as the master communication device (the determination result of step S430 is "Yes"), the touch device may perform steps S440 and S450. In step S440, the controller 12 of the touch device 10 may control the display panel 11 to perform a display driving operation in the display driving periods DP of the display frame period F31. In step S450, the controller 12 may control the display panel 11 to perform a touch sensing operation in the touch sensing periods TP overlapped in the display frame period F31, and the controller 12 transmits the wireless signal WLS to the display panel of the slave communication device (for example, the display panel 21 of the touch device 20) via the display panel 11 in the touch sensing periods TP.

When the touch device (for example, the touch device 20) serves as the slave communication device (the determination result of step S430 is "No"), the touch device may perform steps S460 and S470. In step S460, the controller 22 of the touch device 20 may control the display panel 21 to perform a display driving operation in the display driving periods DP of the display frame period F32. In step S470, the controller 22 may control the display panel 21 to perform a touch sensing operation in the touch sensing periods TP overlapped in the display frame period F32, and the controller 22 receives the wireless signal WLS sent by the display panel of the master communication device (for example, the display panel 11 of the touch device 10) via the display panel 21 in the touch sensing periods TP.

It should be mentioned that, when the touch device is operated in the communication mode and serves as one of the master communication device and the slave communication device, the time length of the touch sensing periods TP may be a first time length; and when the touch device is operated in the communication mode and serves as the other of the master communication device and the slave communication device, the time length of the touch sensing periods TP may be a second time length greater than the first time length. Taking FIG. 1 as an example, when the touch device 10 operated in the communication mode serves as the master communication device, the time length of the touch sensing periods TP of the touch device 10 may be extended from the first time length to the second time length. When the touch device 20 operated in the communication mode serves as the slave communication device, the time length of the touch sensing periods TP of the touch device 20 may be maintained at the first time length.

Based on the above, the touch transmission electrode of the display panel 11 of the touch device 10 of the present embodiment may emit a frequency signal in the touch sensing periods TP to perform the touch sensing operation. The frequency signal sent by the touch transmission electrode may serve as the wireless signal WLS for communication. The touch receiving electrode of the display panel 21 of the touch device 20 may sense a frequency signal to perform the touch sensing operation. Accordingly, the touch receiving electrode of the display panel 21 may be used as receiving antennas for communication to receive the wireless signal WLS from the display panel 11. Therefore, the touch devices 10 and 20 may communicate using the display panels 11 and 21. Since the time length of the touch sensing periods TP of the touch device 10 is extended from the first time length to the second time length, the success rate of the wireless communication between the touch devices 10 and 20 may be effectively improved.

Figure 5:
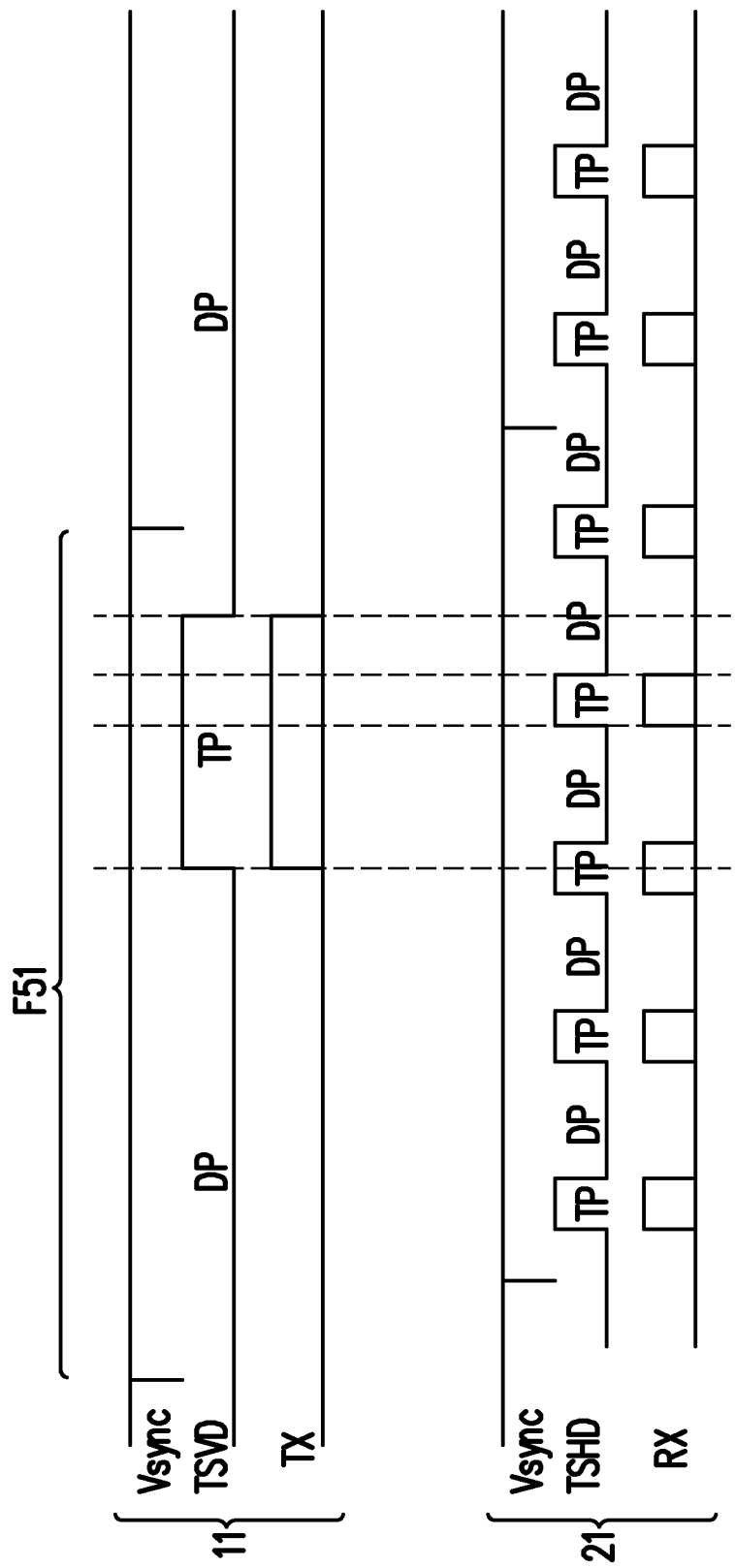
FIG. 5 is a schematic diagram of the operation timing of two display panels of different touch devices shown according to an embodiment of the invention.

FIG. 5 is a schematic diagram of the operation timing of the two display panels 11 and 21 of the different touch devices 10 and 20 shown according to an embodiment of the invention. The horizontal axis of FIG. 5 represents time. The two touch devices 10 and 20 (may be mobile phones, tablet computers, or other devices with touch function) may be referred to as a master device and a slave device. In this case, the touch device 10 is a master communication device, and the touch device 20 is a slave communication device. When communication transmission is not needed between the touch devices 10 and 20, the touch devices 10 and 20 may perform any display panel driving operation. For example, as shown in FIG. 3, the display driving operation and the touch sensing operation are performed in a time division multiplexing manner. When communication transmission is needed between the touch devices 10 and 20, the touch devices 10 and 20 may perform the display panel driving operation shown in FIG. 4 and FIG. 5.

As shown in the lower part of FIG. 5, the touch device 20 (slave communication device) may maintain the original timing configuration for the display driving operation and the touch sensing operation. When the touch device 20 operated in the communication mode serves as a slave communication device, the time length of the touch sensing periods TP of the touch device 20 may be maintained at a first time length. The display panel 21 of the touch device 20 performs a display driving operation in the display driving periods DP and performs a touch sensing operation in the touch sensing periods TP in a time division multiplexing manner. The operation timing of the display panel 21 (slave communication device) shown in the lower part of FIG. 5 may be deduced with reference to the related description of the operation timing of the display panel 21 (slave communication device) shown in the lower part of FIG. 3, and is therefore not repeated herein.

As shown in the upper part of FIG. 5, the vertical synchronization signal Vsync of the touch device 10 may define a plurality of display frame periods of the display panel 11 of the touch device 10, such as a display frame period F51. A control signal TSVD of the touch device 10 may define the timing of the display driving period DP and the touch sensing period TP of the touch device 10 (the touch sensing period TP is after the display driving period DP). The controller 12 may control the display panel 11 to perform a display driving operation in the display driving period DP. According to the control signal TSVD of the touch device 10, the touch transmission electrode TX of the display panel 11 of the touch device 10 may send a touch drive signal to the touch receiving electrode of the display panel 11 of the touch device 10 at the touch sensing period TP to perform a touch sensing operation. In addition, the touch transmission electrode TX of the display panel 11 of the touch device 10 may also send a touch drive signal (the wireless signal WLS) to the display panel 21 of the touch device 20 in the touch sensing period TP.

In the embodiment shown in FIG. 5, when communication transmission is needed between the touch devices 10 and 20, the controller 12 of the touch device 10 may dynamically increase the time length of the touch sensing period TP of the display panel 11. When the touch device 10 operated in the communication mode serves as a master communication device, the time length of the touch sensing periods TP of the touch device 10 may be extended from a first time length to a second time length. For example, the driving operation of the display panel 11 of the touch device 10 may be switched from a Long-H mode to a Long-V mode. In the Long-H mode, the driving operation of the display panel 11 of the touch device 10 includes, in the same display frame period, and in a time division multiplexing manner, performing a display driving operation in the display driving periods DP and performing a touch sensing operation in the touch sensing periods TP (refer to the example shown in the upper part of FIG. 3 for details). In the Long-V mode, the driving operation of the display panel 11 of the touch device 10 includes that the touch sensing periods TP (touch sensing operation) in the same display frame period F51 are not divided (refer to the example shown in the upper part of FIG. 5 for details).

In the embodiment shown in FIG. 5, by increasing the time length of the touch sensing periods TP of the display panel 11 of the touch device 10, the probability that "the timing of the touch sensing periods TP of the display panel 21 of the touch device 20 matches the timing of the touch sensing periods TP of the display panel 11 of the touch device 10" may be improved. That is, the success rate of wireless communication of the touch devices 10 and 20 may be effectively improved. Therefore, the display panel 21 of the touch device 20 more readily receives the wireless signal WLS of the display panel 11 of the touch device 10, so that the communication between the display panel 11 of the touch device 10 and the display panel 21 of the touch device 20 may be implemented.

Figure 6:
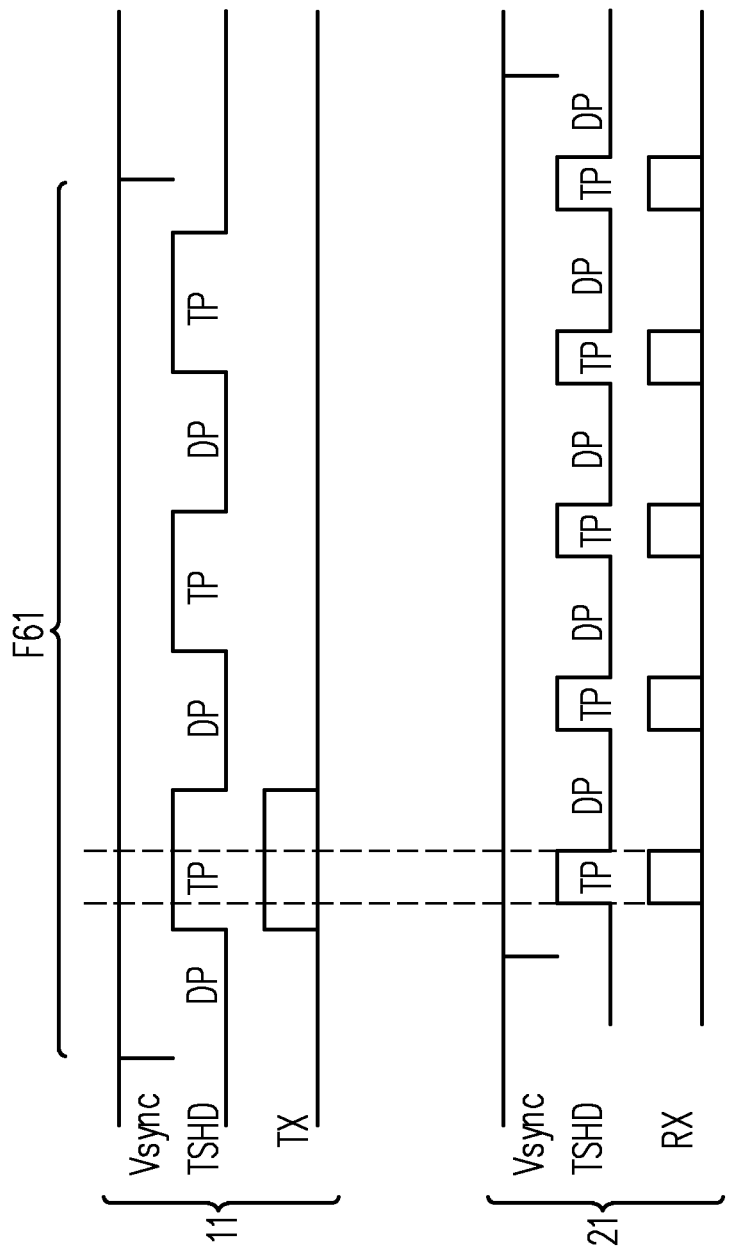
FIG. 6 is a schematic diagram of the operation timing of two display panels of different touch devices shown according to another embodiment of the invention.

FIG. 6 is a schematic diagram of the operation timing of the two display panels 11 and 21 of the different touch devices 10 and 20 shown according to another embodiment of the invention. The horizontal axis of FIG. 6 represents time. In this case, the touch device 10 is a master communication device, and the touch device 20 is a slave communication device. When communication transmission is not needed between the touch devices 10 and 20, the touch devices 10 and 20 may perform any display panel driving operation. For example, as shown in FIG. 3, the display driving operation and the touch sensing operation are performed in a time division multiplexing manner. When communication transmission is needed between the touch devices 10 and 20, the touch devices 10 and 20 may perform the display panel driving operation shown in FIG. 4 and FIG. 6.

When communication transmission is needed between the touch devices 10 and 20, the touch device 20 (slave communication device) may maintain the original timing configuration for the display driving periods DP and the touch sensing periods TP (as shown in the lower part of FIG. 6), and the touch device 10 (master communication device) increases the time length of the touch sensing periods TP (as shown in the upper part of FIG. 6). Therefore, the probability that "the timing of the touch sensing periods TP of the display panel 21 of the touch device 20 matches the timing of the touch sensing periods TP of the display panel 11 of the touch device 10" may be effectively improved.

The lower part of FIG. 6 shows that the display panel 21 of the touch device 20 (slave communication device) performs a display driving operation in the display driving periods DP and performs a touch sensing operation in the touch sensing periods TP in a time division multiplexing manner. The operation timing of the touch device 20 shown in the lower part of FIG. 6 may be deduced with reference to the related description of the operation timing of the display panel 21 (slave communication device) shown in the lower part of FIG. 3, and is therefore not repeated herein. As shown in the lower part of FIG. 6, the touch device 20 may maintain the original timing configuration for the display driving operation and the touch sensing operation. When the touch device 20 operated in the communication mode serves as the slave communication device, the time length of the touch sensing periods TP of the touch device 20 may be maintained at a first time length.

As shown in the upper part of FIG. 6, the vertical synchronization signal Vsync of the touch device 10 may define a plurality of display frame periods of the display panel 11 of the touch device 10, such as a display frame period F61. The display frame period F61 includes a plurality of display driving periods DP and touch sensing periods TP. The control signal TSHD of the display panel 11 of the touch device 10 may define the timing of the display driving periods DP and the touch sensing periods TP of the touch device 10, so that each of the touch sensing periods TP is between two display driving periods DP. The controller 12 may control the display panel 11 to perform a display driving operation in the display driving periods DP. According to the control signal TSHD of the touch device 10, the touch transmission electrode TX of the display panel 11 of the touch device 10 may send a touch drive signal to the touch receiving electrode of the display panel 11 of the touch device 10 at the touch sensing periods TP to perform a touch sensing operation. In addition, the touch transmission electrode TX of the display panel 11 of the touch device 10 may also send a touch drive signal (the wireless signal WLS) to the display panel 21 of the touch device 20 in the touch sensing periods TP.

In the embodiment shown in FIG. 6, when communication transmission is needed between the touch devices 10 and 20, the controller 12 of the touch device 10 may dynamically increase the time length of the touch sensing periods TP of the display panel 11. When the touch device 10 operated in the communication mode serves as the master communication device, the time length of the touch sensing periods TP of the touch device 10 may be extended from a first time length to a second time length. For example, the driving operation of the display panel 11 of the touch device 10 may be maintained in the Long-H mode, but the time length of the touch sensing periods TP of the display panel 11 is increased.

Compared with the embodiment shown in the upper part of FIG. 3, in the embodiment shown in the upper part of FIG. 6, the touch sensing periods TP in one display frame period F61 is divided into three, and the time length of each of the touch sensing periods TP (second time length) shown in the upper part of FIG. 6 is greater than the time length of each of the touch sensing periods TP (first time length) shown in the upper part of FIG. 3. Since the time length of the touch sensing periods TP of the display panel 11 of the touch device 10 is greater than the time length of the touch sensing periods TP of the display panel 21 of the touch device 20, the probability that "the timing of the touch sensing periods TP of the display panel 21 of the touch device 20 matches the timing of the touch sensing periods TP of the display panel 11 of the touch device 10" may be effectively improved. That is, the display panel 21 of the touch device 20 more readily receives the signal of the display panel 11 of the touch device 10, so that the communication between the display panel 11 of the touch device 10 and the display panel 21 of the touch device 20 may be implemented.

Figure 7:
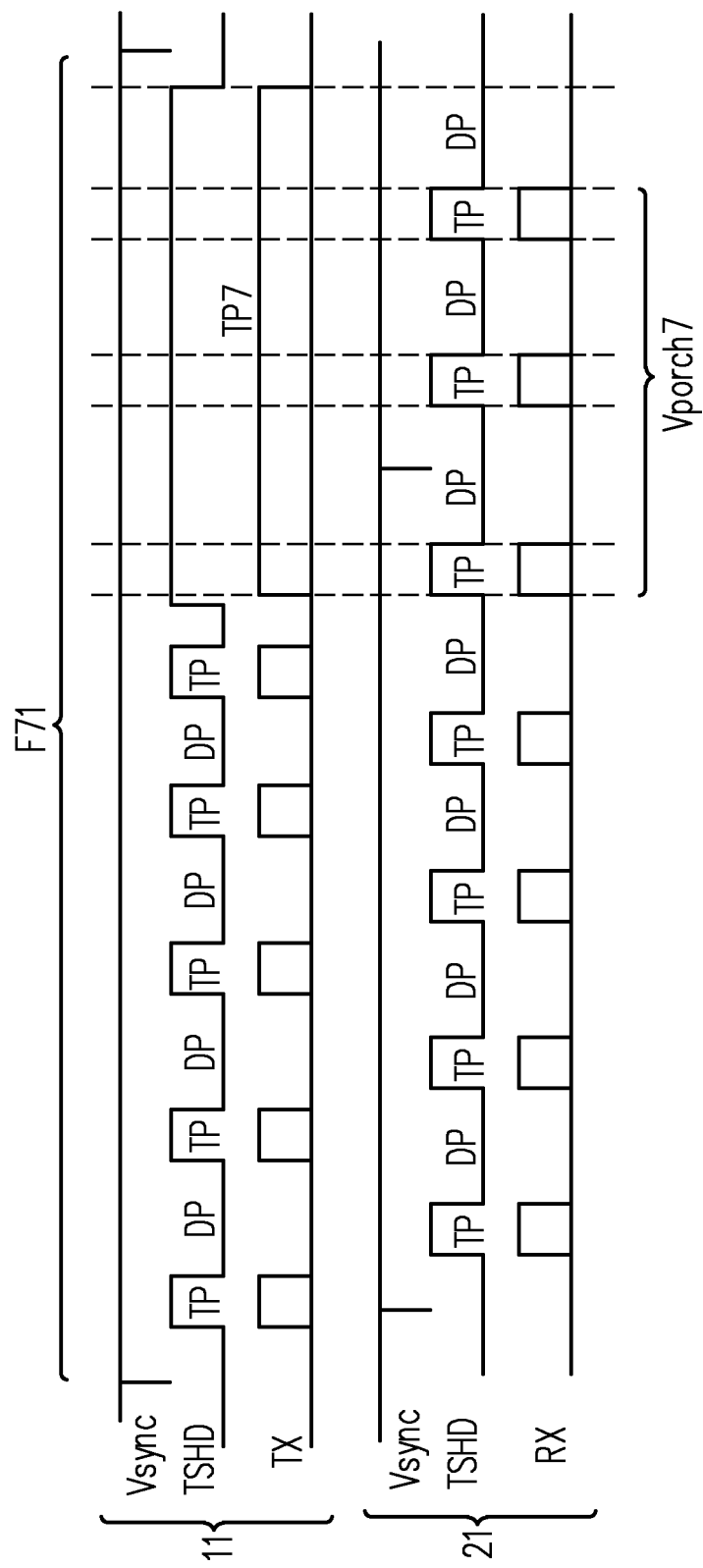
FIG. 7 is a schematic diagram of the operation timing of two display panels of different touch devices shown according to yet another embodiment of the invention.

FIG. 7 is a schematic diagram of the operation timing of the two display panels 11 and 21 of the different touch devices 10 and 20 shown according to yet another embodiment of the invention. The horizontal axis of FIG. 7 represents time. In this case, the touch device 10 is a master communication device, and the touch device 20 is a slave communication device. When communication transmission is not needed between the touch devices 10 and 20, the touch devices 10 and 20 may perform any display panel driving operation. For example, as shown in FIG. 3, the display driving operation and the touch sensing operation are performed in a time division multiplexing manner. When communication transmission is needed between the touch devices 10 and 20, the touch devices 10 and 20 may perform the display panel driving operation shown in FIG. 4 and FIG. 7.

When communication transmission is needed between the touch devices 10 and 20, that is, when the touch devices 10 and 20 are operated in the communication mode, the touch device 20 (slave communication device) may maintain the original timing configuration for the display driving periods DP and the touch sensing periods TP (as shown in the lower part of FIG. 7), and the touch device 10 (master communication device) extends the time length of a vertical porch Vporch7 in a display frame period F71, wherein the extended vertical porch Vporch7 overlaps the touch sensing period TP7 having a second time length. The touch device 20 may perform a touch sensing operation in the touch sensing period TP7. Therefore, the probability that "the timing of the touch sensing periods TP of the display panel 21 of the touch device 20 matches the timing of the touch sensing periods TP of the display panel 11 of the touch device 10" may be effectively improved.

The lower part of FIG. 7 shows that the display panel 21 of the touch device 20 (slave communication device) performs a display driving operation in the display driving periods DP and performs a touch sensing operation in the touch sensing periods TP in a time division multiplexing manner. The operation timing of the touch device 20 shown in the lower part of FIG. 7 may be deduced with reference to the related description of the operation timing of the display panel 21 (slave communication device) shown in the lower part of FIG. 3, and is therefore not repeated herein. As shown in the lower part of FIG. 7, when the touch device 20 operated in the communication mode serves as the slave communication device, the time length of the touch sensing periods TP of the touch device 20 may be maintained at a first time length.

As shown in the upper part of FIG. 7, the vertical synchronization signal Vsync of the touch device 10 may define a plurality of display frame periods of the display panel 11 of the touch device 10, such as a display frame period F71. The display frame period F71 includes a plurality of display driving periods DP, a plurality of touch sensing periods TP, and one vertical porch Vporch7. In the embodiment shown in FIG. 7, the display frame period F71 overlaps the touch sensing periods TP and TP7, the vertical porch Vporch7 overlaps the touch sensing period TP7, and the touch sensing periods TP are outside the extended vertical porch Vporch7. In particular, as shown in FIG. 7, each of the touch sensing periods TP has a first time length, and the vertical porch Vporch7 overlaps the touch sensing period TP7 having a second time length. The control signal TSHD of the display panel 11 of the touch device 10 may define the timings of the display driving periods DP, the touch sensing periods TP, and the touch sensing period TP7 of the display panel 11, as shown in FIG. 7. The controller 12 may control the display panel 11 to perform a display driving operation in the display driving periods DP. According to the control signal TSHD of the touch device 10, the touch transmission electrode TX of the display panel 11 of the touch device 10 may send a touch drive signal to the touch receiving electrode of the display panel 11 of the touch device 10 at the touch sensing periods TP and TP7 to perform a touch sensing operation.

In addition, the touch transmission electrode TX of the display panel 11 of the touch device 10 may also send a touch drive signal (the wireless signal WLS) to the display panel 21 of the touch device 20 in the increased touch sensing period TP7. In the embodiment shown in FIG. 7, the touch transmission electrode TX of the display panel 11 may send a single frequency signal (the wireless signal WLS) to the display panel 21 of the touch device 20 in the touch sensing period TP7. It may be seen from FIG. 7 that, even if the display frame period of the touch device 20 is not synchronized with the display frame period of the touch device 10, the display panel 21 of the touch device 20 may readily receive the wireless signal WLS sent by the display panel 11 of the touch device 10 in the increased touch sensing period TP7, so that the communication between the display panel 11 of the touch device 10 and the display panel 21 of the touch device 20 may be implemented.

Figure 8:
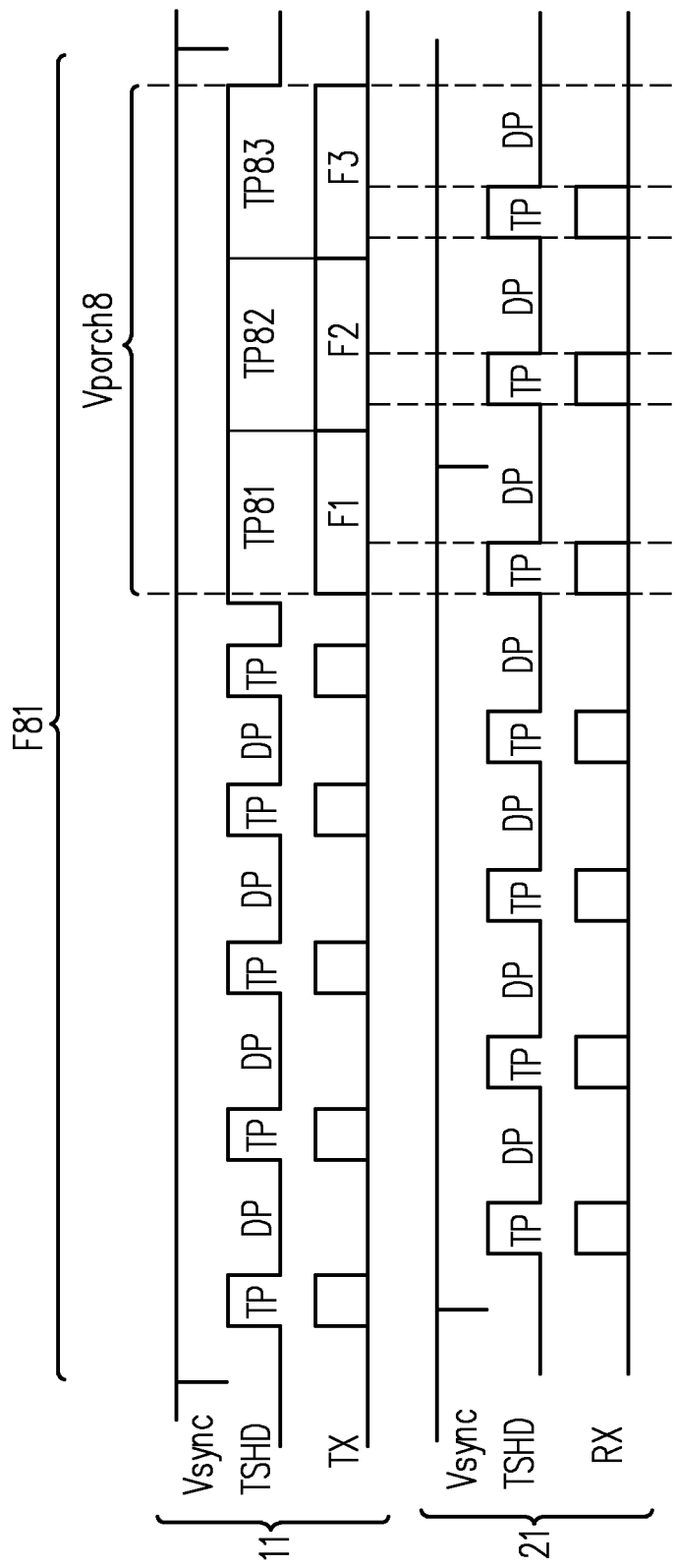
FIG. 8 is a schematic diagram of the operation timing of two display panels of different touch devices shown according to still yet another embodiment of the invention.

FIG. 8 is a schematic diagram of the operation timing of the two display panels 11 and 21 of the different touch devices 10 and 20 shown according to still yet another embodiment of the invention. The horizontal axis of FIG. 8 represents time. When the touch devices 10 and 20 are operated in the communication mode, the touch device 20 (slave communication device) may maintain the original timing configuration for the display driving periods DP and the touch sensing periods TP (as shown in the lower part of FIG. 8), and the touch device 10 (master communication device) extends the time length of a vertical porch Vporch8 in a display frame period F81. The embodiment shown in FIG. 8 may be deduced with reference to the related description of FIG. 7, and is therefore not repeated herein.

The difference from the embodiment shown in FIG. 7 is that, in the embodiment shown in FIG. 8, the extended vertical porch Vporch8 overlaps the touch sensing period, and the touch sensing period includes a plurality of sub-periods (for example, touch sensing periods TP81, TP82, and TP83 shown in FIG. 8). The touch transmission electrode TX of the display panel 11 may send signals of different frequencies (the wireless signal WLS) to the display panel 21 of the touch device 20 in the touch sensing periods TP81, TP82, and TP83, and the different frequencies may have different meanings. For example, the touch transmission electrode TX of the display panel 11 may send the wireless signal WLS with a frequency of F1 in the touch sensing period TP81, send the wireless signal WLS with a frequency of F2 in the touch sensing period TP82, and send the wireless signal WLS with a frequency of F3 in the touch sensing period TP83. The frequencies F1, F2, and F3 may be determined according to actual design.

Figure 9:
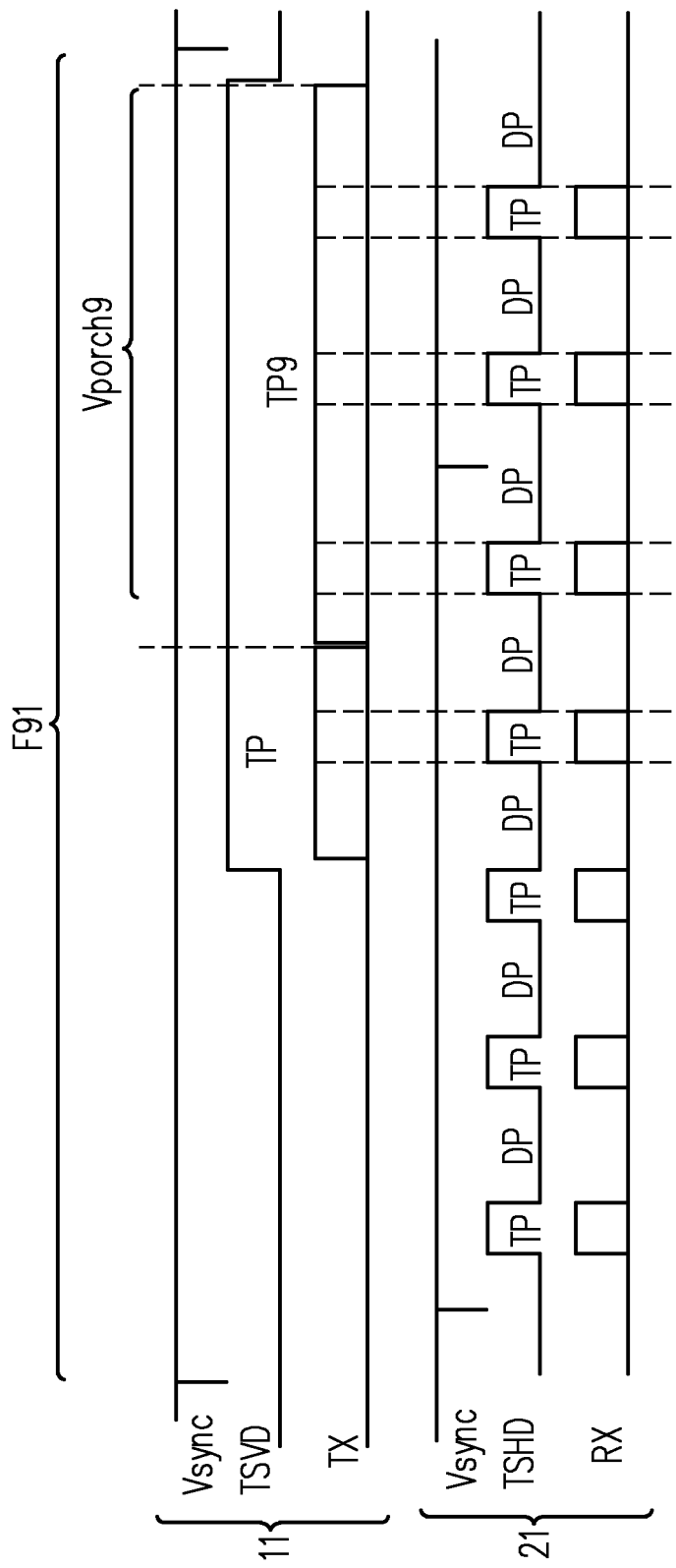
FIG. 9 is a schematic diagram of the operation timing of two display panels of different touch devices shown according to yet another embodiment of the invention.

FIG. 9 is a schematic diagram of the operation timing of the two display panels 11 and 21 of the different touch devices 10 and 20 shown according to another embodiment of the invention. The horizontal axis of FIG. 9 represents time. In this case, when communication transmission is not needed between the touch devices 10 and 20, the touch devices 10 and 20 may perform any display panel driving operation. For example, as shown in FIG. 3, the display driving operation and the touch detection operation are performed in a time division multiplexing manner. When communication transmission is needed between the touch devices 10 and 20, the touch device 20 (slave communication device) may maintain the original timing configuration for the display driving periods DP and the touch detection periods TP (as shown in the lower part of FIG. 9), and the touch device 10 (master communication device) increases the time length of the touch detection periods TP (for example, the driving operation of the display panel 11 may be switched from the Long-H mode to the Long-V mode), and extends the time length of a vertical porch Vporch9 in a display frame period F91.

In the embodiment shown in FIG. 9, the display frame period F91 overlaps the touch sensing periods TP and TP9, the vertical porch Vporch9 overlaps the touch sensing period TP9, and the touch sensing period TP is outside the extended vertical porch Vporch9. In particular, the touch sensing period TP9 shown in FIG. 9 has a second time length (greater than the first time length), and the touch sensing period TP has a third time length (greater than the first time length). The touch transmission electrode TX of the display panel 11 may send the same or different frequency signals (the wireless signal WLS) to the display panel 21 of the touch device 20 in the touch detection periods TP and TP9. The touch detection period TP shown in FIG. 9 may be deduced with reference to the related description of the touch detection period TP shown in FIG. 5, and the touch detection period TP9 shown in FIG. 9 may be deduced with reference to the related description of the touch detection period TP7 shown in FIG. 7 (or the touch detection periods TP81, TP82, and TP83 shown in FIG. 8), and are therefore not repeated herein.

FIG. 10 is a schematic diagram of the operation timing of the two display panels 11 and 21 of the different touch devices 10 and 20 shown according to still yet another embodiment of the invention. The horizontal axis of FIG. 10 represents time. Each small square of FIG. 10 represents different display frame periods F101-1, F101-2, F101-3, F101-4, F101-5, F101-6, F101-7, F101-8, F101-9 and F101-10 of the display panel 11 and different display frame periods F102-1, F102-2, F102-3, F102-4, F102-5, F102-6, F102-7, F102-8, F102-9 and F102-10 of the display panel 21. In each of the display frame periods F101-1 to F101-10 of the display panel 11 of the touch device 10 shown in the upper part of FIG. 10, for the display driving operation and the touch detection operation of the display panel 11, please refer to the related description of the display driving periods DP and the touch detection period TP of the display panel 11 shown in the upper part of FIG. 5, or refer to the related description of the display driving periods DP and the touch detection periods TP of the display panel 11 shown in the upper part of FIG. 6, or refer to the related description of the display panel 11 shown in the upper part of FIG. 7 (or FIG. 8), or refer to the related description of the display panel 11 shown in the upper part of FIG. 9. In each of the display frame periods F102-1 to F102-10 of the display panel 21 of the touch device 20 shown in the lower part of FIG. 10, the display driving operation and the touch detection operation of the display panel 21 of the touch device 20 are as provided in the related description of the display driving periods DP and the touch detection periods TP of the display panel 21 shown in the lower part of FIG. 3.

FIG. 10 discloses one simple example of the communication protocol between the display panel 11 of the touch device 10 and the display panel 21 of the touch device 20. In the embodiment shown in FIG. 10, one bit of data may be transmitted in each display frame period. In this case, as shown in FIG. 10, the wireless signal WLS with the frequency F1 is defined as the logic value "0", the wireless signal WLS with the frequency F2 is defined as the logic value "1", and the wireless signal WLS with the frequency F3 is defined as the starting mark. The touch device 10 intends to transmit the binary data "010" to the touch device 20 to calculate the checksum value of "010" to be "1". The touch device 10 converts the starting mark, the 3-bit data "010", and the checksum value "1" into the frequency signals "F3, F1, F2, F1, F2". In the first transmission, the display panel 11 of the touch device 10 respectively transmits the frequency signal F3, the frequency signal F1, the frequency signal F2, the frequency signal F1, and the frequency signal F2 to the display panel 21 of the touch device 20 in the five display frame periods F101-1 to F101-5, and the display panel 21 of the touch device 20 performs a receiving operation in the five display frame periods F102-1 to F102-5. The touch device 20 obtains the 3-bit data and compares it with the checksum value. If the comparison result is inconsistent, then the display panel 11 of the touch device 10 may perform a second transmission in the other five display frame periods F101-6 to F101-10, and the display panel 21 of the touch device 20 performs a receiving operation in the other five display frame periods F102-6 to F102-10, and so on, until the comparison result is consistent.

Figure 11:
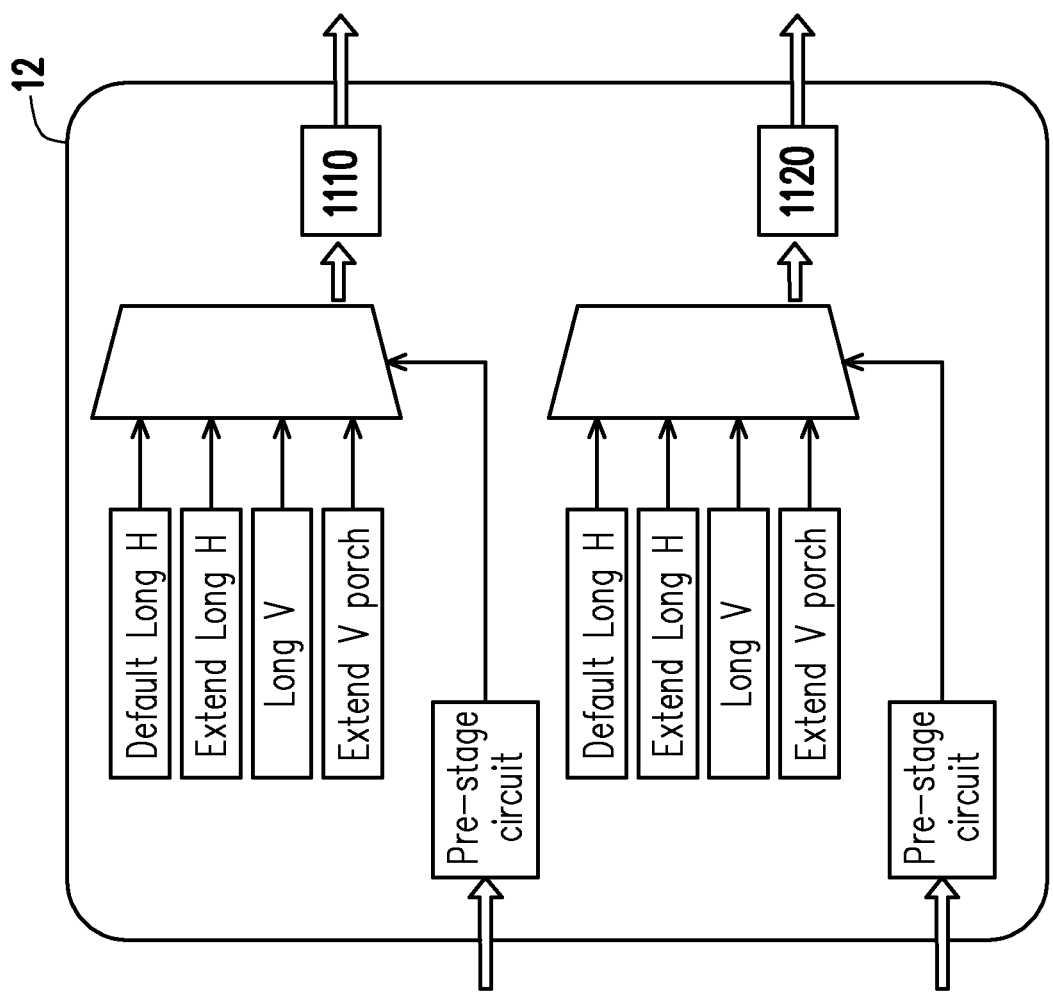
FIG. 11 is a schematic diagram of a circuit block of the controller of the display panel shown in FIG. 1 shown according to an embodiment of the invention.

FIG. 11 is a schematic diagram of a circuit block of the controller 12 of the display panel 11 shown in FIG. 1 shown according to an embodiment of the invention. The controller 22 of the display panel 21 shown in FIG. 1 may be deduced with reference to the related description of the controller 12 of the display panel 11 shown in FIG. 11, and is therefore not repeated herein. In the embodiment shown in FIG. 11, the controller 12 is coupled to the display panel 11. The controller 12 has a plurality of timing tables, such as the timing table "Default Long H", the timing table "Extend Long H", the timing table "Long V", and the timing table "Extend Vporch" as shown in FIG. 11. According to the control of a pre-stage circuit, a TSVD/TSHD generator 1110 may select and use one of these timing tables. When the TSVD/TSHD generator 1110 chooses to use the timing table "Default Long H", the TSVD/TSHD generator 1110 may generate the waveform of the control signal TSHD of the display panel 11 shown in the upper part of FIG. 3. When the TSVD/TSHD generator 1110 chooses to use the timing table "Extend Long H", the TSVD/TSHD generator 1110 may generate the waveform of the control signal TSHD of the display panel 11 shown in the upper part of FIG. 6. When the TSVD/TSHD generator 1110 chooses to use the timing table "Long V", the TSVD/TSHD generator 1110 may generate the waveform of the control signal TSVD of the display panel 11 shown in the upper part of FIG. 5. When the TSVD/TSHD generator 1110 chooses to use the timing table "Extend Vporch", the TSVD/TSHD generator 1110 may generate the waveform of the control signal TSHD of the display panel 11 shown in the upper part of FIG. 7 (or FIG. 8).

The controller 12 also has a plurality of RX setting tables, such as the receiving setting table "Default Long H", the receiving setting table "Extend Long H", the receiving setting table "Long V", and the receiving setting table "Extend Vporch" shown in FIG. 11. According to the control of the pre-stage circuit, a TX/RX generator 1120 may select and use one of these receiving setting tables. When the TX/RX generator 1120 chooses to use the receiving setting table "Default Long H", the TX/RX generator 1120 may perform a touch detection operation in the touch detection periods TP of the display panel 11 shown in the upper part of FIG. 3. When the TX/RX generator 1120 chooses to use the receiving setting table "Extend Long H", the TX/RX generator 1120 may perform a touch detection operation in the touch detection periods TP of the display panel 11 shown in the upper part of FIG. 6. When the TX/RX generator 1120 chooses to use the receiving setting table "Long V", the TX/RX generator 1120 may perform a touch detection operation in the touch detection periods TP of the display panel 11 shown in the upper part of FIG. 5. When the TX/RX generator 1120 chooses to use the receiving setting table "Extend Vporch", the TX/RX generator 1120 may perform a touch detection operation in the touch detection periods TP and TP7 (or in the touch detection periods TP, TP81, TP82, and TP83 of the display panel 11 shown in the upper part of FIG. 8) of the display panel 11 shown in the upper part of FIG. 7.

A plurality of embodiments are described below. The two display panels 11 and 21 of the different touch devices 10 and 20 may perform a "synchronization operation", so that the two display panels 11 and 21 may communicate synchronously. The synchronization operation may be applied to a master communication device and a slave communication device. After the synchronization operation is completed, the timing of the touch detection periods TP of the display panel of the slave communication device (for example, the display panel 21 of the touch device 20) may match the timing of the touch detection periods TP of the display panel of the master communication device (for example, the display panel 11 of the touch device 10).

Figure 12:
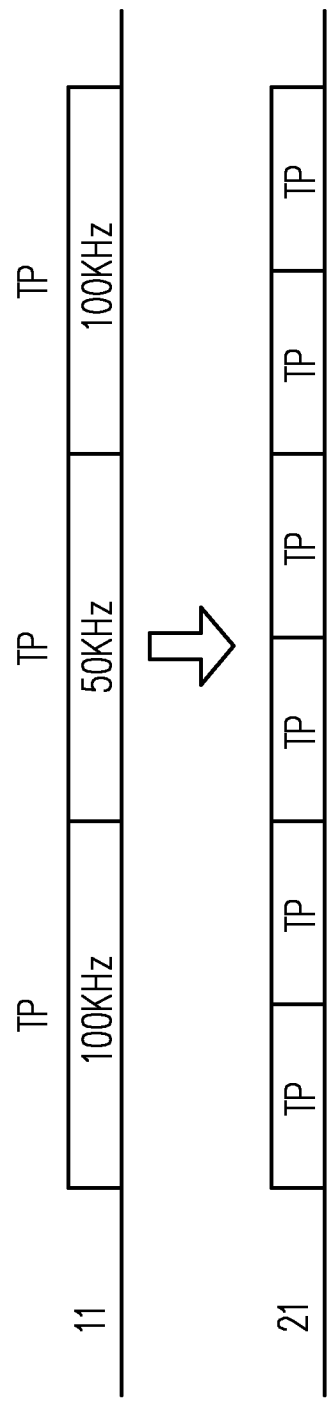
FIG. 12 is a schematic diagram of the timing of two display panels of different touch devices communicating with each other.

For example, FIG. 12 is a schematic diagram of the timing of the two display panels 11 and 21 of the different touch devices 10 and 20 communicating with each other. The horizontal axis of FIG. 12 represents time. The upper part of FIG. 12 shows three touch detection periods TP (transmission periods) of the touch transmission electrode of the display panel 11 of the touch device 10, wherein the display panel 11 of the touch device 10 may transmit different frequency signals in these touch detection periods TP, such as 100 KHz, 50 KHz or other frequencies. According to actual design, different frequencies may be given different meanings. For example, 100 KHz may represent the bit of the logic value "0", and 50 KHz may represent the bit of the logic value "1". Accordingly, in the example shown in FIG. 12, the display panel 11 of the touch device 10 transmits the binary data "010" to the touch device 20 in the touch detection periods TP. The lower part of FIG. 12 shows a plurality of touch detection periods (receiving periods) of the touch receiving electrode of the display panel 21 of the touch device 20. The display panel 21 of the touch device 20 may sample the same touch detection period TP of the display panel 11 of the touch device 10 multiple times to improve the accuracy of receiving data and achieve meaningful wireless packet transmission.

Figure 13:
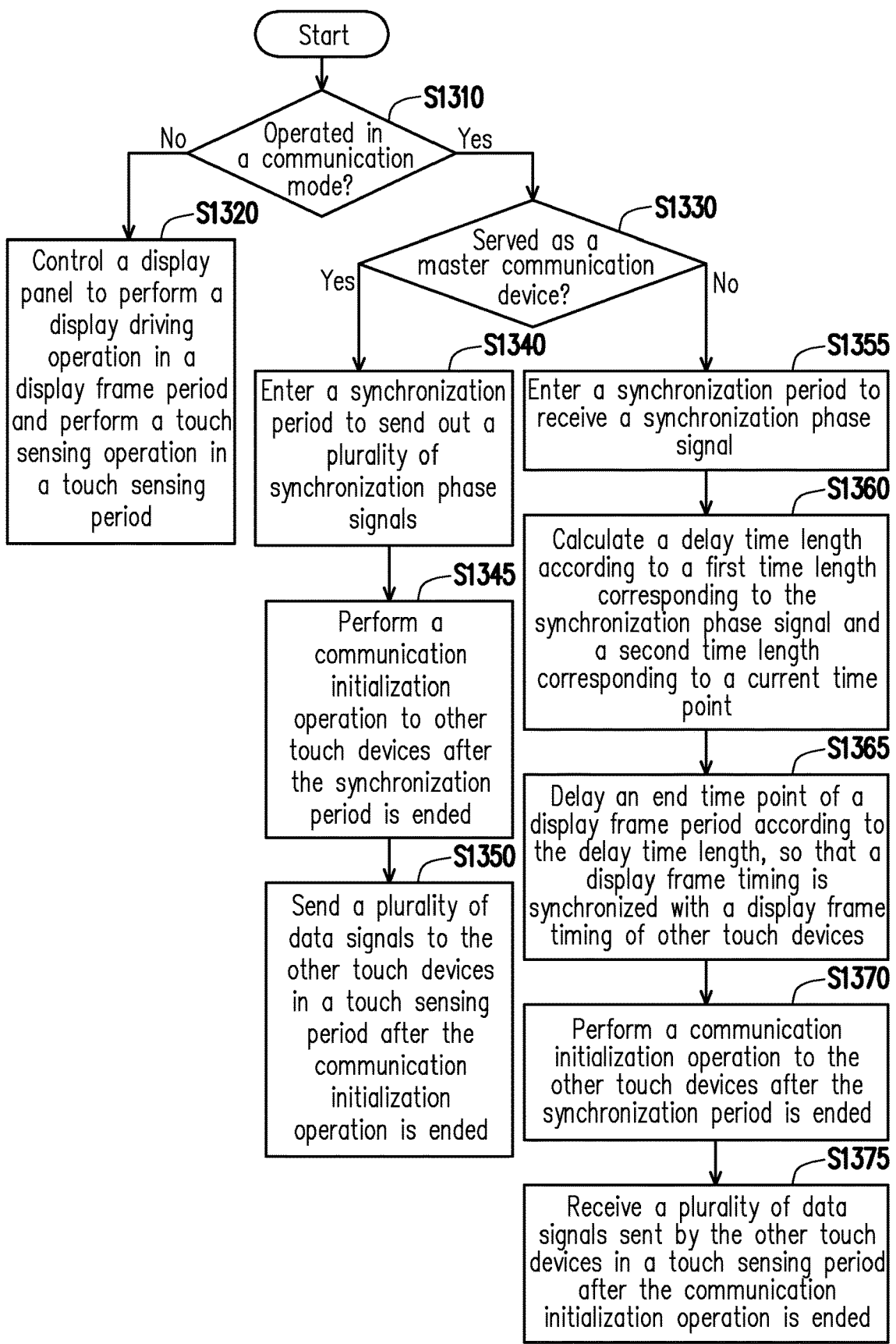
FIG. 13 is a schematic diagram of the flowchart of a communication method of a touch device shown according to another embodiment of the invention.

FIG. 13 is a schematic diagram of the flowchart of a communication method of the touch device 10 and/or the touch device 20 shown according to another embodiment of the invention. The touch device 10 and/or the touch device 20 shown in FIG. 1 is as described in the related description of FIG. 13. For the convenience of description, most of the content of the present embodiment takes the touch device 20 as an example of the communication method, and the communication method of the touch device 10 may be deduced with reference to the related description of the touch device 20. In step S1310, the touch device 20 may determine whether it is operated in a communication mode. The present embodiment does not limit the determination mechanism of the communication mode. Step S1310 shown in FIG. 13 may be deduced with reference to the related description of step S410 shown in FIG. 4, and is therefore not repeated herein.

When the touch device 20 is operated in a non-communication mode (the determination result of step S1310 is "No"), the touch device 20 may perform step S1320. In step S420, the controller 22 of the touch device 20 may control the display panel 21 to perform a display driving operation in the display driving periods DP of the display frame period F31, and perform a touch sensing operation in the touch sensing periods TP overlapped in the display frame period F31. Step S1320 shown in FIG. 13 may be deduced with reference to the related description of step S420 shown in FIG. 4, and is therefore not repeated herein.

When the touch device 10 and the touch device 20 are close to each other, the touch devices 10 and 20 may be operated in a communication mode (the determination result of step S1310 is "Yes"), and the touch devices 10 and 20 may perform step S1330. Step S1330 shown in FIG. 13 may be deduced with reference to the related description of step S430 shown in FIG. 4, and is therefore not repeated herein.

When the touch device (for example, the touch device 10) serves as a master communication device (the determination result of step S1330 is "Yes"), the touch device may perform steps S1340, S1345, and S1350. In step S1340, the controller 12 of the touch device 10 may enter a synchronization period to control the display panel 11 to send a plurality of synchronization phase signals to the display panels of other communication devices (for example, the display panel 21 of the touch device 20). After the synchronization period is ended, the touch device 10 may perform a communication initialization operation to the other touch devices (step S1345, described in detail later). After the communication initialization operation is ended, the display panel 11 of the touch device 10 may send out a plurality of data signals to the display panels of the other touch devices (for example, the display panel 21 of the touch device 20) in the touch sensing period (step S1350).

When the touch device (for example, the touch device 20) serves as a slave communication device (the determination result of step S1330 is "No"), the touch device may perform steps S1355, S1360, S1365, S1370, and S1375. In step S1355, the controller 22 of the touch device 20 may enter the synchronization period. The controller 22 may receive, via the display panel 21 in the current touch sensing period TP of the display panel 21, the synchronization phase signals sent by the display panels of the other touch devices (for example, the display panel 11 of the touch device 10). In particular, the synchronization phase signal may indicate the time length (hereinafter referred to as first time length) between the current time point of the synchronization phase signal in the current display frame period (second display frame period) of the display panel 11 and the end time point of the current display frame period of the display panel 11. Here, "second time length" is defined as the time length between the current time point of the current touch sensing period TP of the display panel 21 and the original end time point of the current display frame period (first display frame period) of the display panel 21.

In step S1360, according to the first time length corresponding to the synchronization phase signal and the second time length corresponding to the current time point, the controller 22 may calculate the "delay time length". In step S1365, the controller 22 may delay the end time point of the current display frame period of the display panel 21 according to the delay time length in order to synchronize the display frame timing of the display panel 21 of the touch device 20 with the display frame timing of the display panel 11 of the touch device 10. After the synchronization period is ended, the touch device 20 may perform a communication initialization operation to the other touch devices (for example, the touch device 10) (step S1370, described in detail later). After the communication initialization operation is ended, the display panel 21 of the touch device 20 may receive a plurality of data signals sent by the display panels of the other touch devices (for example, the display panel 11 of the touch device 10) in the touch sensing period (step S1375).

Figure 14:
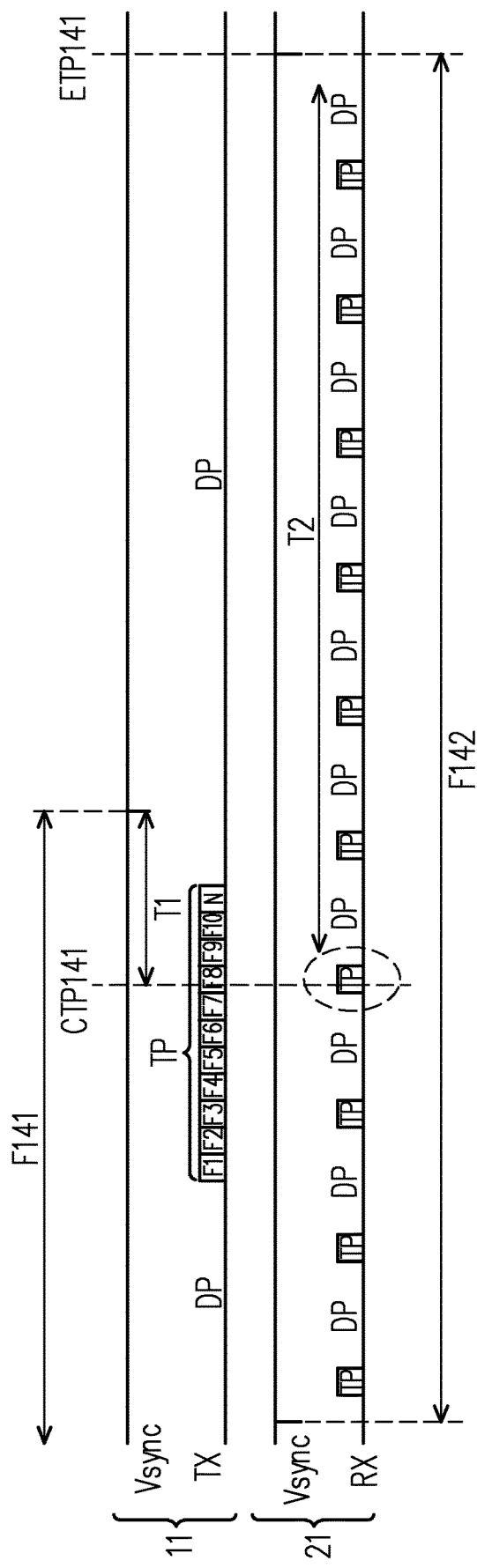
FIG. 14 is a schematic diagram of the operation timing of two display panels of different touch devices shown according to an embodiment of the invention.

FIG. 14 is a schematic diagram of the operation timing of the two display panels 11 and 21 of the different touch devices 10 and 20 shown according to an embodiment of the invention. In this case, the touch device 10 is a master communication device, and the touch device 20 is a slave communication device. When communication transmission is not needed between the touch devices 10 and 20, the touch devices 10 and 20 may perform any display panel driving operation. For example, as shown in FIG. 3, the display driving operation and the touch detection operation are performed in a time division multiplexing manner. When communication transmission is needed between the touch devices 10 and 20, the touch devices 10 and 20 may perform the display panel driving operation shown in FIG. 13 and FIG. 14.

The horizontal axis of FIG. 14 represents time. The lower part of FIG. 14 shows that the display panel 21 of the touch device 20 (slave communication device) performs a display driving operation in the display driving periods DP and performs a touch detection operation in the touch sensing periods TP in a time division multiplexing manner. The operation timing of the display panel 21 of the touch device 20 shown in the lower part of FIG. 14 may be deduced with reference to the related description of the operation timing of the display panel 21 shown in the lower part of FIG. 3, and is therefore not repeated herein. As shown in the lower part of FIG. 14, when the touch device 20 operated in the communication mode serves as the slave communication device, the time length of the touch sensing periods TP of the touch device 20 may be maintained at a first time length.

When transmission is needed between the touch devices 10 and 20, the touch sensing operation of the display panel 11 of the touch device 10 may be switched from the Long-H mode to the Long-V mode. The upper part of FIG. 14 shows that when transmission is needed between the touch devices 10 and 20, the display panel 11 of the touch device 10 performs a touch detection operation in the Long-V mode. During the touch detection periods TP of the display panel 11, the touch transmission electrode of the display panel 11 of the touch device 10 may send a plurality of synchronization phase signals to the display panel 21 of the touch device 20. According to actual design, these synchronization phase signals may be touch drive signals of different frequencies. For example, the frequencies shown in FIG. 14 are the frequency signals F1, F2, F3, F4, F5, F6, F7, F8, F9, and F10 (wireless signals). The touch devices 10 and 20 may predefine the phases of these frequency signals F1 to F10 in one display frame period F141. For example, the frequency signal F1 shown in FIG. 14 may indicate that the distance from the time position (phase) of the frequency signal F1 to the end time point of the current display frame period F141 is 14 time units, wherein the time unit is, for example, a horizontal line count value H-cnt. By analogy, the distance from the time position of the frequency signal F10 to the end time point of the current display frame period F141 is 5 time units. In the embodiment shown in FIG. 14, the time unit of the touch device 10 may match the time unit of the touch device 20.

When the touch devices 10 and 20 are operated in the synchronization period of the communication mode, the controller 22 of the touch device 20 may receive one of a plurality of synchronization phase signals sent by the display panel 11 of the touch device 10 via the display panel 21 in the touch sensing periods TP. For example, in the embodiment shown in FIG. 14, the display panel 21 may receive the frequency signal F8 (one of a plurality of synchronization phase signals) sent by the display panel 11 at a current time point CTP141 (the touch sensing period TP). Based on the specifications (pre-defined) of the communication protocol of the present embodiment, the frequency signal F8 (synchronization phase signal) may indicate that in the display frame period F141 of the touch device 10, the time length between the current time point CTP141 of the frequency signal F8 and the end time point of the display frame period F141 (herein referred to as a first time length T1) is 7 time units. In this definition, the time length between the current time point CTP141 at which the touch sensing period TP of the display panel 21 is located and an original end time point ETP141 of the display frame period F142 is a second time length T2. For the controller 22 of the touch device 20, the second time length T2 is known.

Figure 15:
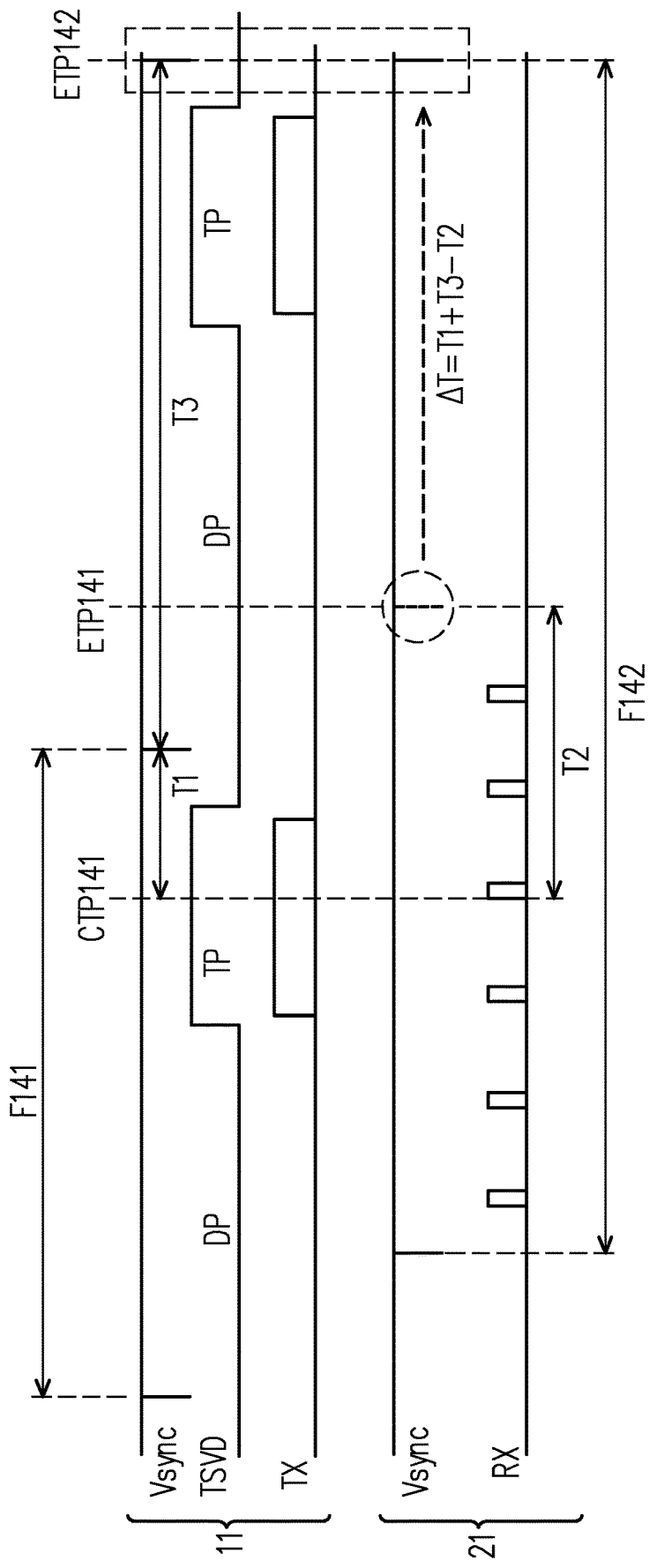
FIG. 15 is a schematic diagram of the operation timing of two display panels of different touch devices shown according to an embodiment of the invention.

FIG. 15 is a schematic diagram of the operation timing of the two display panels 11 and 21 of the different touch devices 10 and 20 shown according to an embodiment of the invention. The horizontal axis of FIG. 15 represents time. The lower part of FIG. 15 shows that the display panel 21 of the touch device 20 (slave communication device) performs a display driving operation and a touch detection operation in a time sharing multiplexing manner (refer to the description of the operation timing of the display panel 21 shown in the lower part of FIG. 3 for details). The upper part of FIG. 15 shows that when transmission is needed between the touch devices 10 and 20, the display panel 11 of the touch device 10 (master communication device) performs a touch detection operation in the Long-V mode. FIG. 15 may be regarded as a simplified version of FIG. 14, and therefore FIG. 15 is as provided in the related description of FIG. 14.

Please refer to FIG. 14 and FIG. 15. The touch receiving electrode RX of the display panel 21 of the touch device 20 may sense the frequency signal (synchronization phase signal) of the display panel 11 of the touch device 10. According to the sensed frequency signal, the touch device 20 may learn that the distance from the current time point CTP141 to the end time point of the current display frame period F141 of the display panel 11 of the touch device 10 is the first time length T1. For example, in the case that the touch receiving electrode RX of the display panel 21 of the touch device 20 senses that the synchronization phase signal of the display panel 11 of the touch device 10 is the frequency signal F8, the touch device 20 may learn that the first time length T1 from the current time point CTP141 to the end time point of the current display frame period F141 of the display panel 11 is 7 time units according to a predetermined definition, as shown in FIG. 14.

The distance from the current time point CTP141 to the original end time point ETP141 of the current display frame period F142 of the display panel 21 of the touch device 20 is the second time length T2. The controller 22 of the touch device 20 may calculate a delay time length $\Delta T$ according to the first time length T1, the second time length T2, and a third time length T3. The controller 22 may delay the end time point of the display frame period F142 according to the delay time length $\Delta T$, so that the display frame timing of the touch device 20 is synchronized with the display frame timing of the touch device 10.

In this case, the time length of the display frame period (for example, the display frame period F141) of the touch device 10 and the time length of the display frame period (for example, the display frame period F142) of the touch device 20 are both the third time length T3. Based on the prior definition, the third time period T3 is a known value. Therefore, the controller 22 of the touch device 20 may calculate a delay time length according to the first time length T1, the second time length T2, and the third time length T3. For example, the controller 22 may calculate $\Delta T=T1+T3-T2$ and learn the phase difference (the delay time length $\Delta T$) between the display frame period F141 of the display panel 11 of the touch device 10 and the display frame period F142 of the display panel 21 of the touch device 20, as shown in FIG. 15. Therefore, the controller 22 of the touch device 20 may extend the time length of the display frame period F142 from the third time length T3 to the sum of the third time length T3 and the delay time length $\Delta T$. That is, the controller 22 may delay the end time point of the current display frame period F142 of the display panel 21 from the original end time point ETP141 to a new end time point ETP142 according to the delay time length $\Delta T$, so that the display frame period of the touch device 20 may be synchronized with the display frame period of the touch device 10. After the synchronization operations shown in FIG. 14 and FIG. 15 are completed, the display panel 21 of the touch device 20 may communicate with the display panel 11 of the touch device 10 (for example, the communication operation shown in FIG. 12 or other communication operations).

Figure 16:
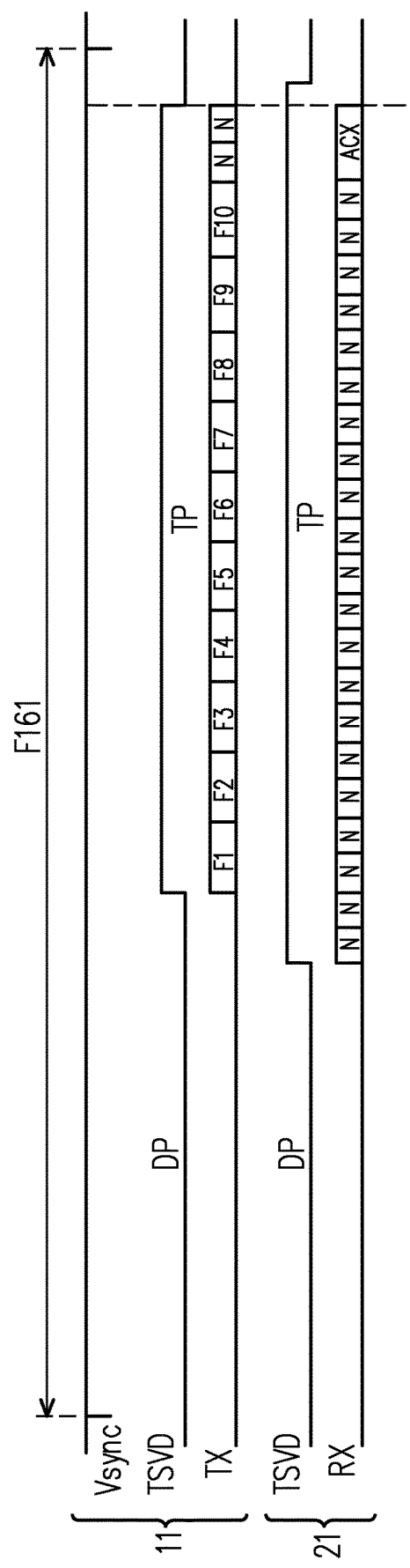
FIG. 16 is a schematic diagram of the operation timing of two display panels of different touch devices shown according to an embodiment of the invention.

In the next display frame period after the synchronization period (the synchronization operation described in FIG. 14 and FIG. 15) is ended, the controller 22 of the touch device 20 may perform a communication initialization operation to the touch device 10 via the display panel 21, so that the timings of the two match each other. For example, FIG. 16 is a schematic diagram of the operation timing of the two display panels 11 and 21 of the different touch devices 10 and 20 shown according to an embodiment of the invention. The horizontal axis of FIG. 16 represents time. After the synchronization operation shown in FIG. 14 and FIG. 15 is completed, the display panel 21 of the touch device 20 and the display panel 11 of the touch device 10 may perform the communication initialization operation shown in FIG. 16, so that the two may confirm the requirements with each other and confirm that the timings of the two match each other.

In the communication initialization operation, the touch sensing operation of the display panel 11 and the display panel 21 may be switched from the Long-H mode to the Long-V mode, and then a signal transmission operation is started. After the touch sensing operation of the display panel 11 of the touch device 10 is switched to the Long-V mode, the touch transmission electrode TX of the display panel 11 of the touch device 10 may transmit a standardized header packet (frequency signal sequence as shown in FIG. 16) to the display panel 21 of the touch device 20, and then the display panel 11 receives a response signal ACK from the display panel 21.

In the touch sensing period TP in the display frame period F161, the controller 22 of the touch device 20 may receive a header packet sent by the display panel 11 of the touch device 10 via the touch receiving electrode RX of the display panel 21. The controller 22 may check whether the received header packet complies with a certain specification sequence. If the received header packet meets the specification sequence (expected frequency signal sequence), then the controller 22 may return the response signal ACK to the display panel 11 of the touch device 10 via the display panel 21 in the touch sensing period TP of the display frame period F161.

The controller 22 of the touch device 20 may calculate the time difference between the vertical synchronization signal Vsync of the display panel 11 and the vertical synchronization signal Vsync of the display panel 21 according to the received frequency signal of the header packet (the phase difference between the display frame period of the touch device 10 and the display frame period of the touch device 20), and report this time difference to the previous host circuit. The host circuit (not shown) may reduce the display frame rate (lengthen the pulse interval of the vertical synchronization signal Vsync), so that the vertical synchronization signal Vsync of the touch device 20 is aligned with the vertical synchronization signal Vsync of the touch device 10. Then, the touch sensing operation of the display panel 21 of the touch device 20 may be switched back from the Long-V mode to the Long-H mode. From now on, the timing of the touch detection period TP of the display panel 21 of the touch device 20 may match the timing of the touch detection period TP of the display panel 11 of the touch device 10. Therefore, the display panel 21 of the touch device 20 may communicate with the display panel 11 of the touch device 10 (for example, the communication operation shown in FIG. 12 or other communication operations).

After the touch devices 10 and 20 complete the synchronization of the vertical synchronization signal Vsync, the touch device 20 may further fine-tune the vertical synchronization signal Vsync according to the status of receiving packets thereof. For example, in the case that the touch device 20 finds that the received header packet is one time unit late (for example, the horizontal line count value H-cnt), the touch device 20 may calculate the time gap between the vertical synchronization signal Vsync of the touch device 20 and the vertical synchronization signal Vsync of the touch device 10 according to the start time point at which the signal packet is sensed. The touch device 20 may fine-tune the timing of the vertical synchronization signal Vsync according to this time gap, for example, slightly lengthen the vertical porch (Vporch) in the current display frame period. In this way, the vertical synchronization signal Vsync of the touch device 20 may be aligned with the vertical synchronization signal Vsync of the touch device 10.

Figure 17:
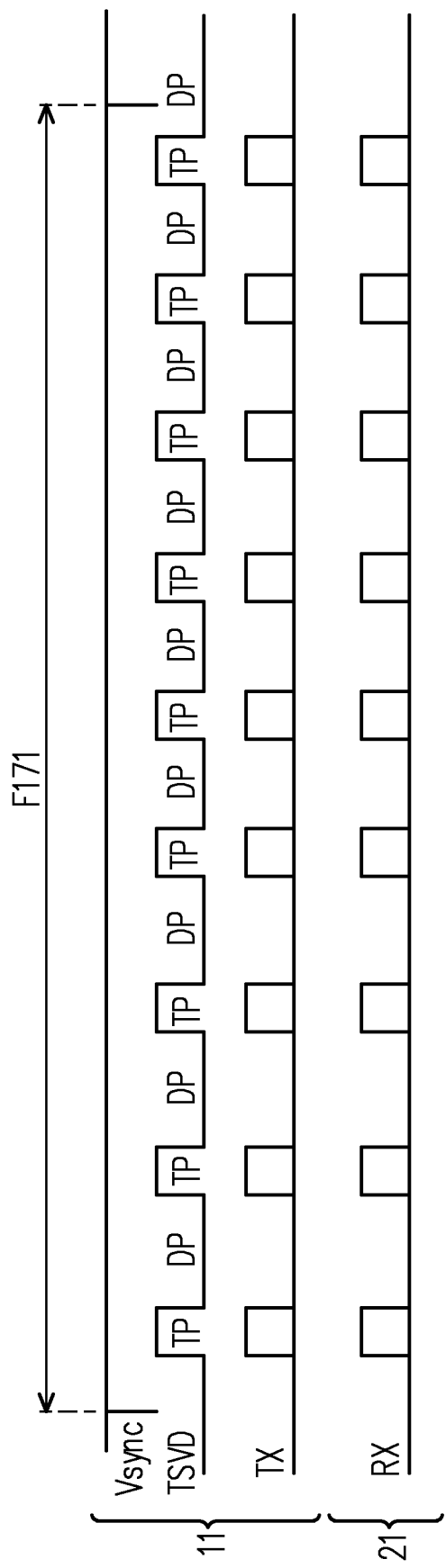
FIG. 17 is a schematic diagram of a communication timing of two display panels of different touch devices after a communication initialization operation is completed shown according to an embodiment of the invention.

FIG. 17 is a schematic diagram of a communication timing of the two display panels 11 and 21 of the different touch devices 10 and 20 after a communication initialization operation is completed shown according to an embodiment of the invention. The horizontal axis of FIG. 17 represents time. After the communication initialization operation is ended, the vertical synchronization signals Vsync of the touch devices 10 and 20 are successfully aligned. From now on, the drive operation of the display panels of the master device and the slave device may be switched back from the Long-V mode to the Long-H mode for data transmission. As shown in FIG. 17, in the display frame period F171 after the communication initialization operation is ended, the controller 22 of the touch device 20 may receive a plurality of data signals (frequency signals) sent by the touch transmission electrode TX of the display panel 11 of the touch device 10 via the touch receiving electrode RX of the display panel 21 in the plurality of touch sensing periods TP in the display frame period F171.

Figure 18:
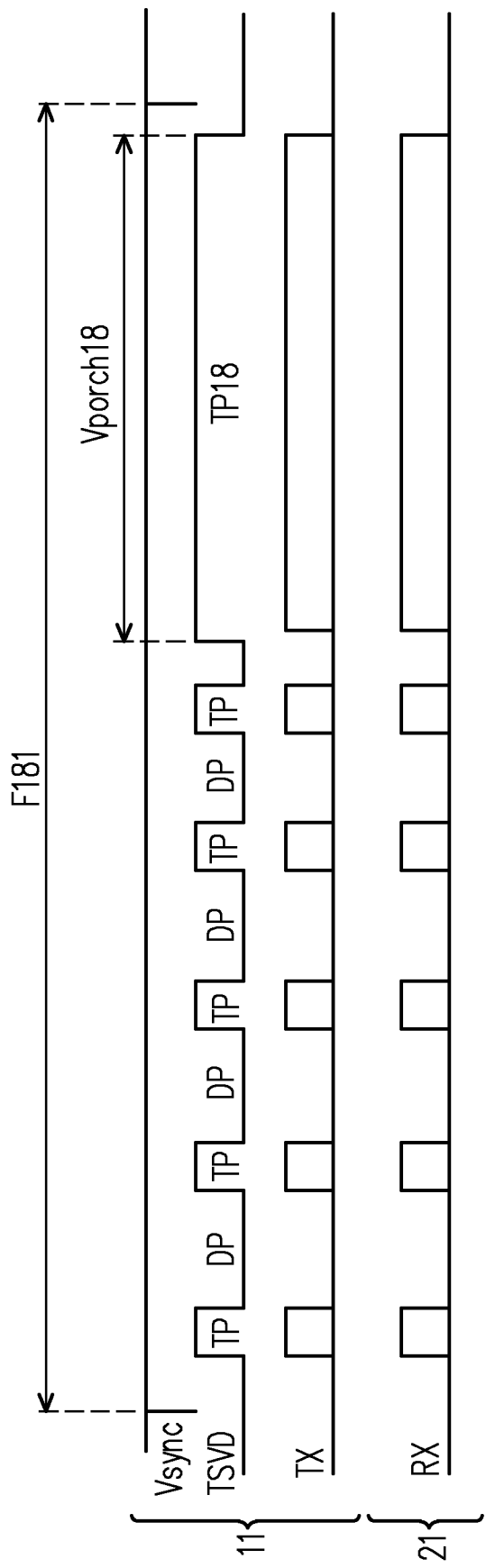
FIG. 18 is a schematic diagram of a communication timing of two display panels of different touch devices after a communication initialization operation is completed shown according to another embodiment of the invention.

FIG. 18 is a schematic diagram of a communication timing of the two display panels 11 and 21 of the different touch devices 10 and 20 after a communication initialization operation is completed shown according to another embodiment of the invention. The horizontal axis of FIG. 18 represents time. After the communication initialization operation is completed, the vertical synchronization signals Vsync of the touch devices 10 and 20 are successfully aligned. From now on, the touch sensing operation of the display panels of the touch devices 10 and 20 may be switched back from the Long-V mode to the Long-H mode, as shown in FIG. 18.

The controller 12 of the touch device 10 and the controller 22 of the touch device 20 may extend the time length of the vertical porch (for example, a vertical porch Vporch18 of a display frame period F181) in the display frame period after the communication initialization operation is ended. In particular, the extended vertical porch Vporch18 overlaps a touch sensing period TP18. The controller 12 transmits the data signal (frequency signal) through the touch transmission electrode TX of the display panel 11 of the touch device 10 in the extended vertical porch Vporch18 (the touch sensing period TP18), and the controller 22 receives the data signal sent by the display panel 11 of the touch device 10 via the touch receiving electrode RX of the display panel 21 of the touch device 20 in the extended vertical porch Vporch18 (the touch sensing period TP18).

According to different design requirements, the controller 12 and/or the controller 22 may be implemented in the form of hardware, firmware, software (i.e., program), or a combination of a plurality of the three. In terms of hardware, the controller 12 and/or the controller 22 may be implemented in a logic circuit on an integrated circuit. The related functions of the controller 12 and/or the controller 22 may be implemented as hardware using a hardware description language such as Verilog HDL or VHDL or other suitable programming languages. For example, the related functions of the controller 12 and/or the controller 22 may be implemented in one or more controllers, microcontrollers, microprocessors, application-specific integrated circuits (ASICs), digital signal processors (DSPs), field-programmable gate arrays (FPGAs), and/or various logic blocks, modules, and circuits in other processing units.

In software form and/or firmware form, the related functions of the controller 12 and/or the controller 22 may be implemented as programming codes. For example, the controller 12 and/or the controller 22 may be implemented using a general programming language (such as C, C++, or a combination language) or other suitable programming languages. The programming code may be recorded/stored in a "non-transitory readable medium". In some embodiments, the non-transitory readable medium includes, for example, a tape, a disk, a card, a semiconductor memory, a programmable logic circuit, and/or a storage device. A central processing unit (CPU), a controller, a microcontroller, or a microprocessor may read and execute programming codes from a non-transitory readable medium to achieve the related functions of the controller 12 and/or the controller 22.

Based on the above, the touch transmission electrode TX of the display panel 11 of the touch device 10 in the above embodiments may emit a frequency signal in the touch sensing periods TP to perform a touch sensing operation. The frequency signal sent by the touch transmission electrode TX may serve as the wireless signal WLS for communication. The touch receiving electrode RX of the display panel 21 of the touch device 20 may sense a frequency signal to perform a touch sensing operation. Accordingly, the touch receiving electrode RX of the display panel 21 may be used as a receiving antenna for communication to receive the wireless signal WLS sent by the touch transmission electrode TX of the display panel 11. Therefore, the touch devices 10 and 20 may communicate using the display panels 11 and 21.

Although the invention has been described with reference to the above embodiments, it will be apparent to one of ordinary skill in the art that modifications to the described embodiments may be made without departing from the spirit of the disclosure. Accordingly, the scope of the disclosure is defined by the attached claims not by the above detailed descriptions.

What is claimed is:
1. A touch device, comprising:
 a first display panel; and
 a controller coupled to the first display panel and configured to control the first display panel to perform a display driving operation in a display frame period and control the first display panel to perform a touch sensing operation in a first touch sensing period overlapped in the display frame period, wherein, when the touch device is operated in a communication mode and serves as a master communication device, the controller transmits a first wireless signal to a second display panel of another slave communication device via the first display panel in the first touch sensing period;

when the touch device is operated in the communication mode and serves as a slave communication device, the controller receives a second wireless signal sent by a third display panel of another master communication device via the first display panel in the first touch sensing period;

when the touch device is operated in the communication mode and serves as one of the master communication device and the slave communication device, a time length of the first touch sensing period is a first time length; and when the touch device is operated in the communication mode and serves as the other of the master communication device and the slave communication device, the time length of the first touch sensing period is a second time length greater than the first time length.

2. The touch device of claim 1, wherein the time length of each of the first touch sensing period is the first time length when the touch device is operated in a non-communication mode.

3. The touch device of claim 1, wherein the display frame period comprises a display driving period, the controller controls the first display panel to perform the display driving operation in the display driving period, and the first touch sensing period is after the display driving period.

4. The touch device of claim 1, wherein the display frame period comprises a plurality of display driving periods, the controller controls the first display panel to perform the display driving operation in the display driving periods, and the first touch sensing period is between two of the display driving periods.

5. The touch device of claim 4, wherein the controller controls the first display panel to perform the touch sensing operation in a second touch sensing period, the display frame period overlaps the second touch sensing period, and the second touch sensing period is between two of the display driving periods.

6. The touch device of claim 1, wherein when the touch device is operated in the communication mode, a vertical porch of the display frame period is extended, and the extended vertical porch overlaps the first touch sensing period having the second time length.

7. The touch device of claim 6, wherein the first touch sensing period comprises a plurality of sub-periods, and the sub-periods are configured to transmit or receive different wireless signals.

8. The touch device of claim 6, wherein the controller controls the first display panel to perform the touch sensing operation in a second touch sensing period, the display frame period overlaps the second touch sensing period, the second touch sensing period is outside the extended vertical porch, and a time length of the second touch sensing period is the first time length.

9. The touch device of claim 6, wherein the controller controls the first display panel to perform the touch sensing operation in a second touch sensing period, the display frame period overlaps the second touch sensing period, the second touch sensing period is outside the extended vertical porch, and a time length of the second touch sensing period is a third time length greater than the first time length.

10. The touch device of claim 9, wherein the controller transmits a third wireless signal to the second display panel of the other slave communication device via the first display panel in the second touch sensing period when the touch device is operated in the communication mode and serves as the master communication device.

11. A communication method of a touch device, comprising:

controlling, by a controller of the touch device, a first display panel of the touch device to perform a display driving operation in a display frame period and perform a touch sensing operation in a first touch sensing period overlapped in the display frame period;

transmitting, by the controller, a first wireless signal to a second display panel of another slave communication device via the first display panel in the first touch sensing period when the touch device is operated in a communication mode and serves as a master communication device; and receiving, by the controller, a second wireless signal sent by a third display panel of another master communication device via the first display panel in the first touch sensing period when the touch device is operated in the communication mode and serves as a slave communication device;

wherein a time length of the first touch sensing period is a first time length when the touch device is operated in the communication mode and serves as one of the master communication device and the slave communication device; and the time length of the first touch sensing period is a second time length greater than the first time length when the touch device is operated in the communication mode and serves as the other of the master communication device and the slave communication device.

12. The communication method of claim 11, wherein the time length of each of the first touch sensing period is the first time length when the touch device is operated in a non-communication mode.

13. The communication method of claim 11, wherein the display frame period comprises a display driving period, and the communication method further comprises:

controlling, by the controller, the first display panel to perform the display driving operation in the display driving period, wherein the first touch sensing period is after the display driving period.

14. The communication method of claim 11, wherein the display frame period comprises a plurality of display driving periods, and the communication method further comprises:

controlling, by the controller, the first display panel to perform the display driving operation in the display driving periods, wherein the first touch sensing period is between two of the display driving periods.

15. The communication method of claim 14, further comprising:

controlling, by the controller, the first display panel to perform the touch sensing operation in a second touch sensing period, wherein the display frame period overlaps the second touch sensing period, and the second touch sensing period is between two of the display driving periods.

16. The communication method of claim 11, further comprising:

extending a vertical porch of the display frame period when the touch device is operated in the communication mode, wherein the extended vertical porch overlaps the first touch sensing period having the second time length.

17. The communication method of claim 16, wherein the first touch sensing period comprises a plurality of sub-periods, and the sub-periods are configured to transmit or receive different wireless signals.

18. The communication method of claim 16, further comprising:
controlling, by the controller, the first display panel to perform the touch sensing operation in a second touch sensing period, wherein the display frame period overlaps the second touch sensing period, the second touch sensing period is outside the extended vertical porch, and a time length of the second touch sensing period is the first time length.

19. The communication method of claim 16, further comprising:
controlling, by the controller, the first display panel to perform the touch sensing operation in a second touch sensing period, wherein the display frame period overlaps the second touch sensing period, the second touch sensing period is outside the extended vertical porch, and a time length of the second touch sensing period is a third time length greater than the first time length.

20. The communication method of claim 19, further comprising:
transmitting, by the controller, a third wireless signal to the second display panel of the other slave communication device via the first display panel in the second touch sensing period when the touch device is operated in the communication mode and serves as the master communication device.

21. A touch device, comprising:
a first display panel; and
a controller, coupled to the first display panel, and configured to control the first display panel to perform a display driving operation in a first display frame period and control the first display panel to perform a touch sensing operation in a first touch sensing period overlapped in the first display frame period, wherein,
when the touch device is operated in a synchronization period of a communication mode, the controller receives a synchronization phase signal sent by a second display panel of another touch device via the first display panel in the first touch sensing period, wherein the synchronization phase signal is configured to indicate a first time length between a current time point of the synchronization phase signal in a second display frame period of the other touch device to an end time point of the second display frame period, and a time length between the current time point at which the first touch sensing period is located and an original end time point of the first display frame period is a second time length;
the controller calculates a delay time length according to the first time length and the second time length; and
the controller delays an end time point of the first display frame period according to the delay time length, so that a display frame timing of the touch device is synchronized with a display frame timing of the other touch device.

22. The touch device of claim 21, wherein a time length of the second display frame period is a third time length, and the controller calculates the delay time length by adding the first time length to the third time length and subtracting the second time length, so that a time length of the first display frame period is extended from the third time length to a sum of the third time length and the delay time length.

23. The touch device of claim 21, wherein in a third display frame period after the synchronization period is ended, the controller performs a communication initialization operation to the other touch device via the first display panel so that timings of the two match each other.

24. The touch device of claim 23, wherein the communication initialization operation comprises:
receiving, by the controller, a header packet sent by the second display panel of the other touch device via the first display panel in a second touch sensing period in the third display frame period;
checking, by the controller, whether the header packet complies with a specification sequence; and
sending, by the controller, a response signal back to the other touch device via the first display panel in the second touch sensing period in a case that the header packet complies the specification sequence.

25. The touch device of claim 24, wherein in a fourth display frame period after the communication initialization operation is ended, the controller receives a plurality of data signals sent by the second display panel of the other touch device via the first display panel in a plurality of third touch sensing periods in the fourth display frame period.

26. The touch device of claim 24, wherein the controller extends a vertical porch of a fourth display frame period after the communication initialization operation is ended, and the controller receives a plurality of data signals sent by the second display panel of the other touch device via the first display panel in the extended vertical porch.

27. A communication method of a touch device, comprising:
controlling, by a controller of the touch device, a first display panel of the touch device to perform a display driving operation in a first display frame period;
controlling, by the controller, the first display panel to perform a touch sensing operation in a first touch sensing period overlapped in the first display frame period;
receiving, by the controller, a synchronization phase signal sent by a second display panel of another touch device via the first display panel in the first touch sensing period when the touch device is operated in a synchronization period of a communication mode, wherein the synchronization phase signal is configured to indicate a first time length between a current time point of the synchronization phase signal in a second display frame period of the other touch device to an end time point of the second display frame period, and a time length between the current time point at which the first touch sensing period is located and an original end time point of the first display frame period is a second time length;
calculating, by the controller, a delay time length according to the first time length and the second time length; and
delaying, by the controller, an end time point of the first display frame period according to the delay time length, so that a display frame timing of the touch device is synchronized with a display frame timing of the other touch device.

28. The communication method of claim 27, wherein a time length of the second display frame period is a third time length, and the communication method further comprises:

obtaining, by the controller, the delay time length by adding the first time length to the third time length and subtracting the second time length; and extending a time length of the first display frame period from the third time length to a sum of the third time length and the delay time length.

29. The communication method of claim 27, further comprising:

performing, by the controller, a communication initialization operation to the other touch device via the first display panel in a third display frame period after the synchronization period is ended so that timings of the two match each other.

30. The communication method of claim 29, wherein the communication initialization operation comprises:

receiving, by the controller, a header packet sent by the second display panel of the other touch device via the first display panel in a second touch sensing period in the third display frame period;

checking, by the controller, whether the header packet complies with a specification sequence; and sending, by the controller, a response signal back to the other touch device via the first display panel in the second touch sensing period in a case that the header packet complies the specification sequence.

31. The communication method of claim 30, further comprising:

receiving, by the controller, a plurality of data signals sent by the second display panel of the other touch device via the first display panel in a plurality of third touch sensing periods in a fourth display frame period after the communication initialization operation is ended.

32. The communication method of claim 30, further comprising:

extending, by the controller, a vertical porch in a fourth display frame period after the communication initialization operation is ended; and receiving, by the controller, a plurality of data signals sent by the second display panel of the other touch device via the first display panel in the extended vertical porch.

* * * * *